US011978970B2

(12) United States Patent
Matsunaga et al.

(10) Patent No.: US 11,978,970 B2
(45) Date of Patent: May 7, 2024

(54) ANTENNA DEVICE

(71) Applicant: YOKOWO CO., LTD., Tokyo (JP)

(72) Inventors: Kazuya Matsunaga, Tomioka (JP); Takeshi Sampo, Tomioka (JP); Yuki Kikuchi, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 101 days.

(21) Appl. No.: 17/772,592

(22) PCT Filed: Oct. 27, 2020

(86) PCT No.: PCT/JP2020/040177
§ 371 (c)(1),
(2) Date: Apr. 28, 2022

(87) PCT Pub. No.: WO2021/085402
PCT Pub. Date: May 6, 2021

(65) Prior Publication Data

US 2022/0416429 A1 Dec. 29, 2022

(30) Foreign Application Priority Data

Oct. 29, 2019 (JP) ................................ 2019-196598

(51) Int. Cl.
*H01Q 9/04* (2006.01)
*H01Q 1/36* (2006.01)
(Continued)

(52) U.S. Cl.
CPC ............. *H01Q 9/0471* (2013.01); *H01Q 1/36* (2013.01); *H01Q 1/48* (2013.01); *H01Q 5/307* (2015.01)

(58) Field of Classification Search
None
See application file for complete search history.

(56) References Cited

U.S. PATENT DOCUMENTS 11,069,961 B2 7/2021 Sampo et al.
2008/0316117 A1* 12/2008 Hill ........................ H01Q 13/10 343/702

(Continued)

FOREIGN PATENT DOCUMENTS

JP 2004-128940 A 4/2004
JP 2004-328330 A 11/2004

(Continued)

OTHER PUBLICATIONS

Extended European search report dated Oct. 26, 2023, in corresponding European patent Application No. 20882568.7, 9 pages.

(Continued)

*Primary Examiner* — Jany Richardson
(74) *Attorney, Agent, or Firm* — XSENSUS LLP

(57) ABSTRACT

An antenna device (10) includes a substrate (100) including a first surface (102), a first antenna (200) provided on the substrate (100), a second antenna (300) provided on the substrate (100), and a third antenna (400) provided on the first surface (102) of the substrate (100), and a center point (CP) of the third antenna (400) is positioned on the same side as an end portion (EP2) of the second antenna (300) furthest from the first antenna (200), relative to a center line (CL) passing through a center of a line (L) connecting an end portion (EP1) of the first antenna (200) furthest from the second antenna (300) and the end portion (EP2) of the second antenna (300) furthest from the first antenna (200), or relative to a center line (CL) of the first surface (102) of the substrate (100).

20 Claims, 14 Drawing Sheets

(51) Int. Cl.
*H01Q 1/48* (2006.01)
*H01Q 5/307* (2015.01)

(56) References Cited

U.S. PATENT DOCUMENTS

| | | | | |
|---|---|---|---|---|
| 2011/0140975 | A1* | 6/2011 | Shigetomi | H01Q 21/28 343/713 |
| 2015/0071137 | A1 | 3/2015 | Thiam et al. | |
| 2016/0064807 | A1* | 3/2016 | Reed | H01Q 21/28 343/749 |
| 2018/0109006 | A1 | 4/2018 | Ng et al. | |
| 2019/0273311 | A1* | 9/2019 | Sampo | H01Q 21/29 |

FOREIGN PATENT DOCUMENTS

| | | | |
|---|---|---|---|
| JP | 2006-86688 | A | 3/2006 |
| JP | 2006-222657 | A | 8/2006 |
| JP | 2008-141300 | A | 6/2008 |
| JP | 2009-278591 | A | 11/2009 |
| JP | 2014-160902 | A | 9/2014 |
| WO | 2018/110671 | A1 | 6/2018 |

OTHER PUBLICATIONS

International Search Report and Written Opinion dated Dec. 28, 2020, received for PCT Application PCT/JP2020/040177, Filed on Oct. 27, 2020, 8 pages including English Translation.

* cited by examiner

10

10

10

10

10

10

ANTENNA DEVICE

CROSS-REFERENCE TO RELATED APPLICATIONS

The present application is based on PCT filing PCT/JP2020/040177, filed Oct. 27, 2020, which claims priority to JP 2019-196598, filed Oct. 29, 2019, the entire contents of each are incorporated herein by reference.

TECHNICAL FIELD

The present invention relates to an antenna device.

BACKGROUND ART

In recent years, an antenna device including a plurality of antennas mounted on a ground plate has been developed. For example, in an antenna device described in Patent Documents 1 and 2, a first antenna for telephone, a second antenna for telephone, a third antenna for Global Positioning System (GPS), and a fourth antenna for Electronic Toll Collection (ETC) mounted on a ground plate. The third antenna and the fourth antenna are positioned between the first antenna and the second antenna.

RELATED DOCUMENT

Patent Document

[Patent Document 1] Japanese Unexamined Patent Publication No. 2014-160902

[Patent Document 2] Japanese Unexamined Patent Publication No. 2009-278591

SUMMARY OF THE INVENTION

Technical Problem

In some cases, the radiation directivity of an antenna for Global Navigation Satellite System (GNSS), such as GPS, needs to be directed in a zenithal direction. When the antenna for GNSS is positioned between the two antennas for telephone as described in Patent Document 1 or 2, for example, however, the radiation directivity of the antenna for GNSS may be inclined from the zenithal direction by the antennas for telephone.

An example of an object of the present invention is to improve the radiation directivity of an antenna positioned between two antennas.

Furthermore, when a screw for fixing an antenna, a metal member for adjusting an angle of the antenna, or a screw or a pin attached to a substrate or the like is positioned between the two antennas for telephone and is positioned near the antenna for GNSS, they may contribute to the oscillation of GNSS.

Another example of an object of the present invention is to suppress the oscillation of an antenna due to an influence of a metal-containing member positioned near the antenna.

Other objects of the present invention will become apparent from the description of the specification.

Solution to Problem

An example of a first aspect of the present invention is an antenna device including a substrate including a first surface, a first antenna provided on the substrate, a second antenna provided on the substrate, and a third antenna provided on the first surface of the substrate, in which a center point of the third antenna is positioned on a same side as an end portion of the second antenna furthest from the first antenna, relative to a center line passing through a center of a line connecting an end portion of the first antenna furthest from the second antenna and the end portion of the second antenna furthest from the first antenna, or relative to a center line of the first surface of the substrate.

An example of a second aspect of the present invention is an antenna device including a substrate including a first surface, a first antenna provided on the substrate, a second antenna provided on the substrate, and a third antenna provided on the first surface of the substrate, a metal-containing member other than an antenna positioned between the first antenna and the second antenna, in which the metal-containing member is positioned on a same side as an end portion of the second antenna furthest from the first antenna, relative to a center line passing through a center of a line connecting an end portion of the first antenna furthest from the second antenna and the end portion of the second antenna furthest from the first antenna, or relative to a center line of the first surface of the substrate.

Another example of the second aspect of the present invention is an antenna device including a substrate including a first surface, a first antenna provided on the substrate, a second antenna provided on the substrate, and a third antenna provided on the first surface of the substrate, a metal-containing member other than an antenna provided on the substrate and positioned between the first antenna and the second antenna, in which the metal-containing member is in non-conduction with a conductor pattern provided on the substrate.

Advantageous Effects of Invention

According to the above-described first aspect of the present invention, the radiation directivity of an antenna positioned between two antennas can be improved.

According to the above-described second aspect of the present invention, the oscillation of an antenna due to an influence of a metal-containing member positioned near an antenna can be suppressed.

DESCRIPTION OF EMBODIMENTS

Figure 1:
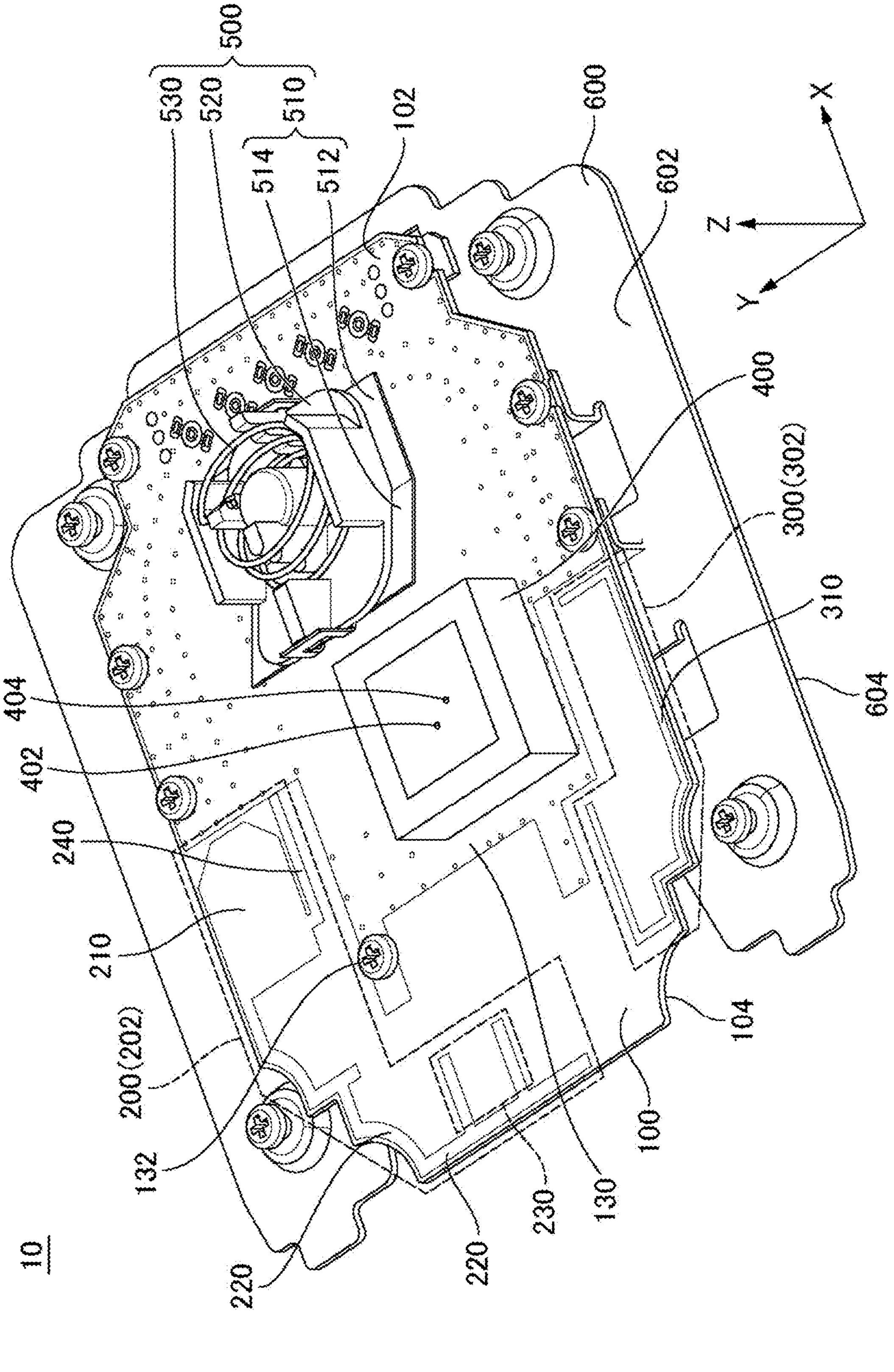
FIG. 1 is a perspective view of an antenna device according to an embodiment.

Hereinafter, an embodiment of the present invention will be described referring to the drawings. In all the drawings, the same components are represented by the same reference numerals and description thereof will be omitted.

In the specification, ordinal numbers, such as "first", "second", and "third", are attached only for distinguishing configurations to which the same names are attached unless specifically noted otherwise, and do not mean particular features (for example, an order or a degree of importance) of the configurations.

Figure 2:
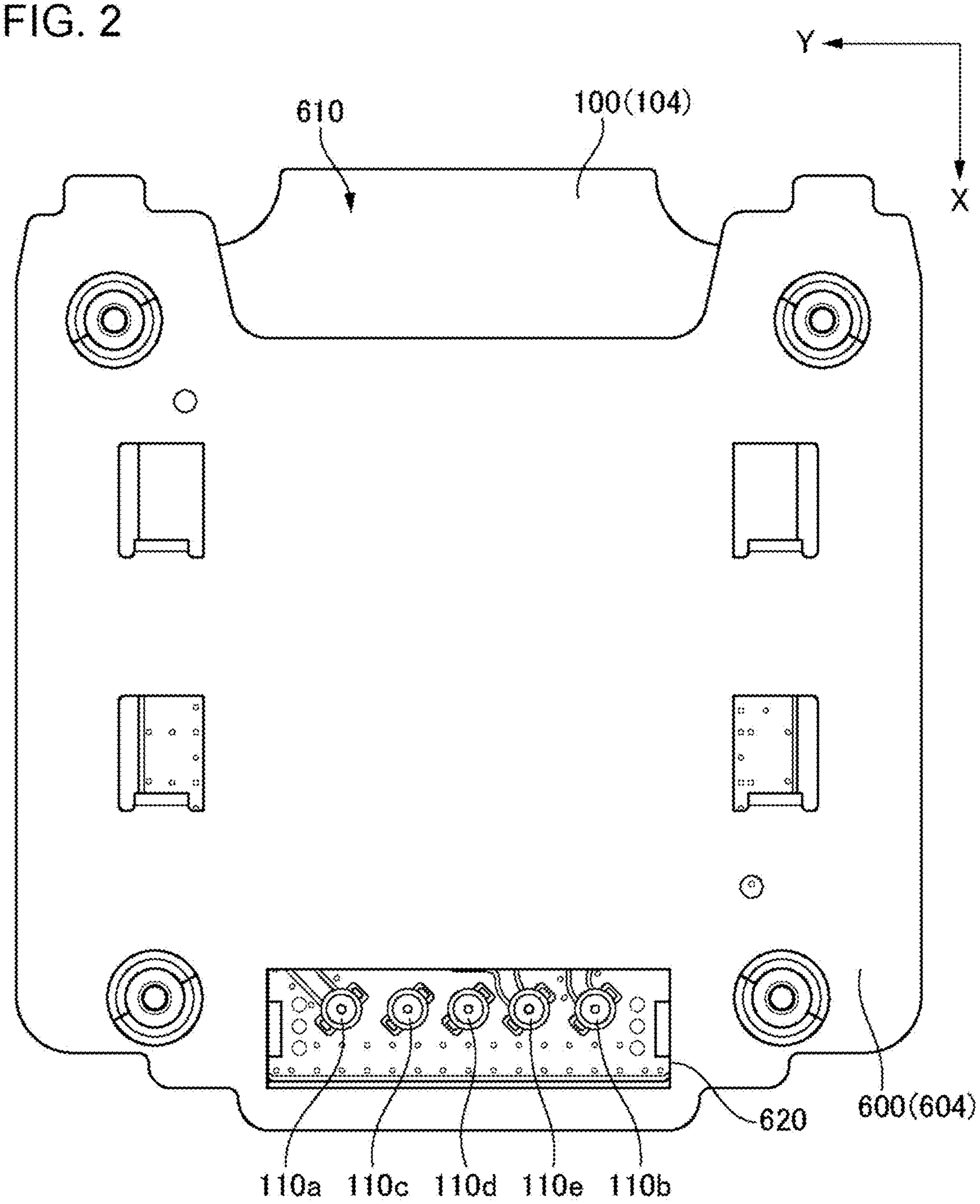
FIG. 2 is a bottom view of the antenna device shown in FIG. 1.
Figure 3:
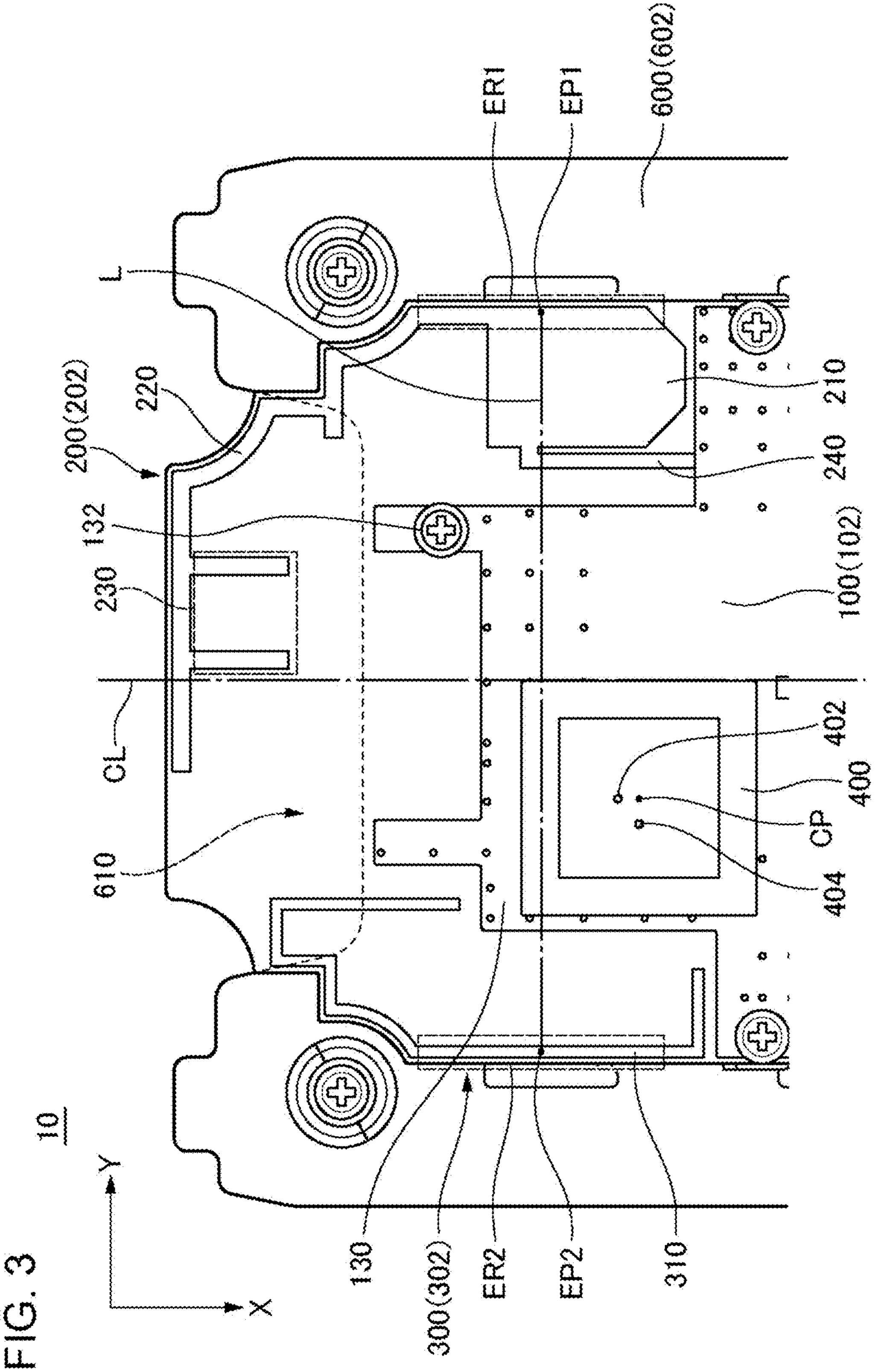
FIG. 3 is an enlarged top view of a part of the antenna device shown in FIG. 1.
Figure 4:
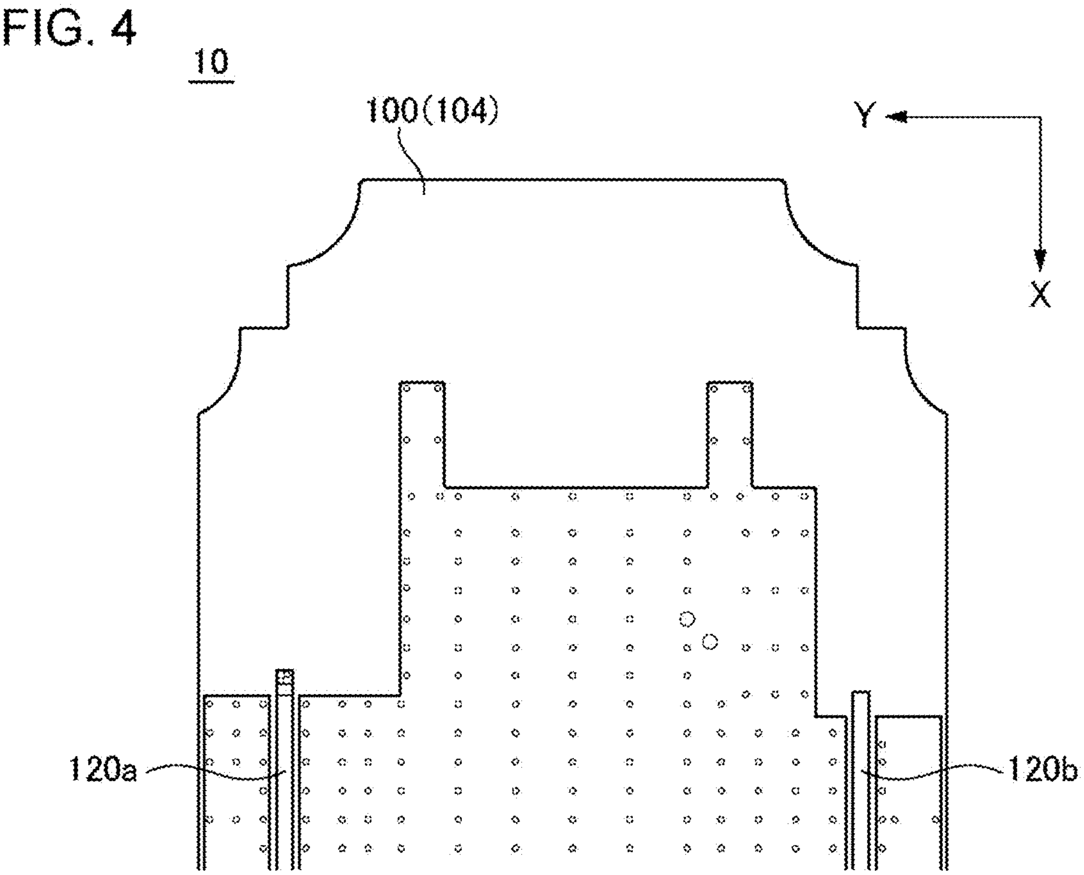
FIG. 4 is a bottom view of a substrate shown in FIG. 1.
Figure 5:
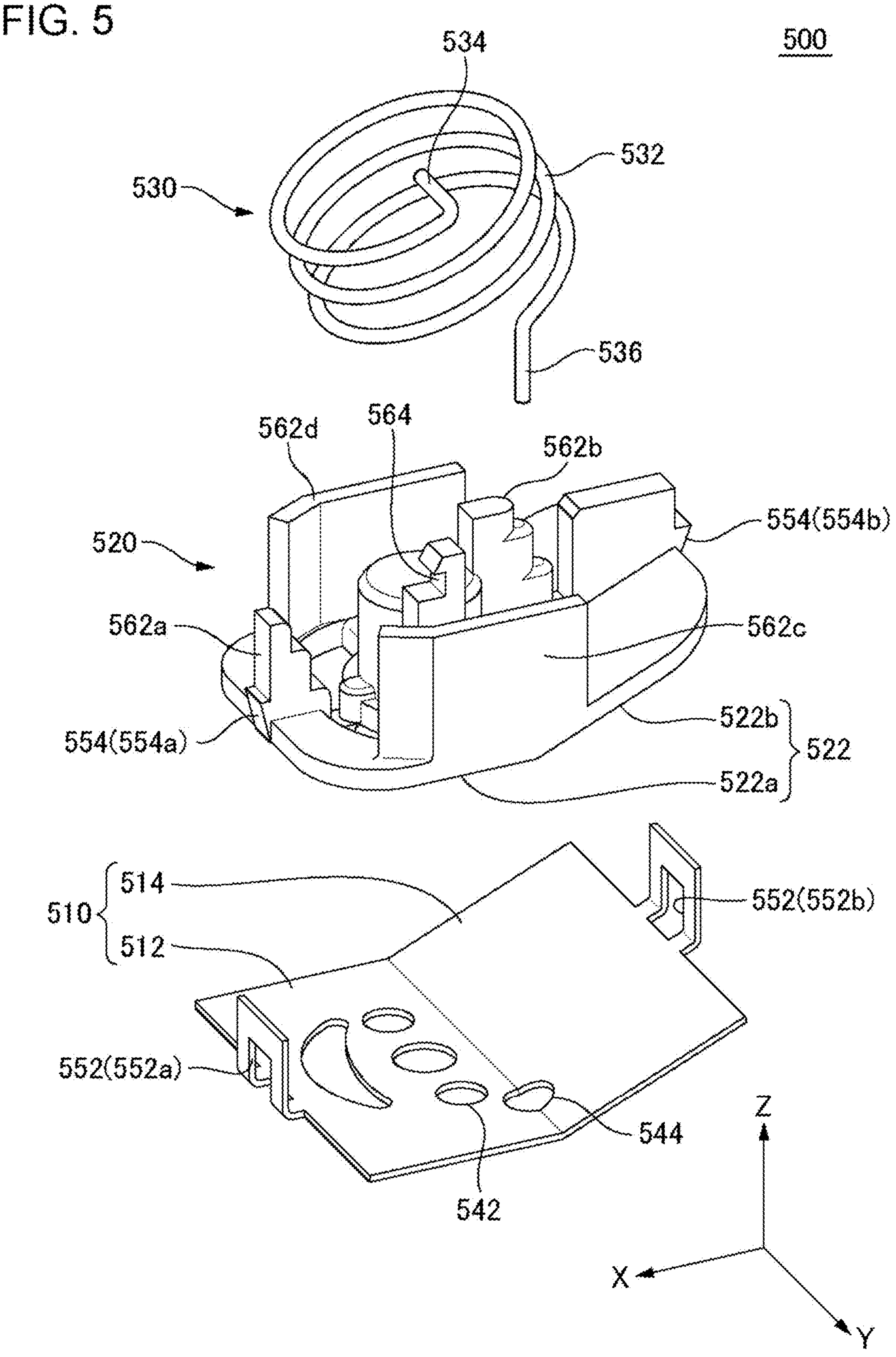
FIG. 5 is an exploded perspective view of a fourth antenna shown in FIG. 1.

FIG. 1 is a perspective view of an antenna device 10 according to the embodiment. FIG. 2 is a bottom view of the antenna device 10 shown in FIG. 1. FIG. 3 is an enlarged top view of a part of the antenna device 10 shown in FIG. 1. FIG. 4 is a bottom view of a substrate 100 shown in FIG. 1. FIG. 5 is an exploded perspective view of a fourth antenna 500 shown in FIG. 1.

In FIGS. 1 to 5, a first direction X is a front-rear direction of the antenna device 10. A positive direction of the first direction X (a direction indicated by an arrow attached to the first direction X) is a front direction of the antenna device 10. A negative direction of the first direction X (a direction opposite to the direction indicated by the arrow attached to the first direction X) is a rear direction of the antenna device 10. In FIGS. 1 to 5, a second direction Y is a right-left direction of the antenna device 10 and is perpendicular to the first direction X. A positive direction of the second direction Y (a direction indicated by an arrow attached to the second direction Y) is a right direction of the antenna device 10 as viewed from the front of the antenna device 10. A negative direction of the second direction Y (a direction opposite to the direction indicated by the arrow attached to the second direction Y) is a left direction of the antenna device 10 as viewed from the front of the antenna device 10. In FIGS. 1 to 5, a third direction Z is an up-down direction of the antenna device 10 and is perpendicular to both the first direction X and the second direction Y. A positive direction of the third direction Z (a direction indicated by an arrow attached to the third direction Z) is an upward direction of the antenna device 10. A negative direction of the third direction Z (a direction opposite to the direction indicated by the arrow attached to the third direction Z) is a downward direction of the antenna device 10.

The antenna device 10 according to the embodiment can be utilized, for example, as a vehicle antenna device, and can be utilized in various devices depending on purposes other than the vehicle.

The antenna device 10 includes a substrate 100, a first antenna 200, a second antenna 300, a third antenna 400, a fourth antenna 500, and a ground plate 600.

The substrate 100 has a first surface 102 and a second surface 104. The substrate 100 is, for example, a printed circuit board (PCB). Here, the first surface 102 of the substrate 100 is referred to as an upper surface of the substrate 100. The second surface 104 of the substrate 100 is opposite to the first surface 102 of the substrate 100 in the third direction Z and is referred to as a lower surface of the substrate 100.

The substrate 100 is held by the ground plate 600. The ground plate 600 has a third surface 602 and a fourth surface 604. The ground plate 600 is, for example, sheet metal. Here, the third surface 602 of the ground plate 600 is referred to as an upper surface of the ground plate 600. The fourth surface 604 of the ground plate 600 is opposite to the third surface 602 of the ground plate 600 in the third direction Z and is a lower surface of the ground plate 600. The ground plate 600 holds the substrate 100 such that the second surface 104 of the substrate 100 faces the third surface 602 of the ground plate 600. The ground plate 600 has a notch 610 (details will be described below) and an opening 620. The notch 610 of the ground plate 600 is positioned on a rear side of the antenna device 10 (a side in the negative direction of the first direction X), and the opening 620 of the ground plate 600 is positioned on a front side of the antenna device 10 (a side in the positive direction of the first direction X). A first terminal 110*a*, a second terminal 110*b*, a third terminal 110*c*, a fourth terminal 110*d*, and a fifth terminal 110*e* of the substrate 100 are exposed from the opening 620 of the ground plate 600. Wiring for electrically connecting the first terminal 110*a*, the second terminal 110*b*, the third terminal 110*c*, the fourth terminal 110*d*, and the fifth terminal 110*e* to external elements of the antenna device 10 can path through, for example, the opening 620 of the ground plate 600.

The first antenna 200 is an antenna conducting transmission and reception of radio waves. In the embodiment, the first antenna 200 is an antenna for telephone, and more specifically, is a main antenna for telephone. Note that the first antenna 200 may be an antenna for a purpose different from telephone.

The first antenna 200 has a first conductive pattern 202. The first conductive pattern 202 is provided on the first surface 102 side of the substrate 100. Note that the first conductive pattern 202 may be provided at a place of the substrate 100 different from the first surface 102 side of the substrate 100. The first conductive pattern 202 (first antenna 200) has a main portion 210, a first extension portion 220, a branch portion 230, and a short-circuit portion 240.

The main portion 210 and the first extension portion 220 have shapes of operating as a multiband (for example, a frequency band of telephone). The main portion 210 has a self-similar shape, and accordingly, an operation band of the first antenna 200 is widened. The first extension portion 220 extends linearly from the main portion 210 along an outer edge of the substrate 100. Examples of as an antenna having a self-similar shape includes an antenna that has a similar shape even though a scale (size ratio) changes, such as a biconical antenna or a bow-tie antenna. As a premise of the antenna having the self-similar shape, when an antenna size and a frequency keep an inversely proportional relationship, the electrical characteristics of the antenna show the same characteristics in principle even though the antenna size or the frequency changes. In actual design, for adjustment of impedance, a shape of an isosceles triangle radiating element, such as a biconical antenna or a bow-tie antenna, can be deformed to a semi-elliptical shape or a trapezoidal shape such as the main portion 210 in the embodiment. Even in such a case, the constant electrical characteristics obtained by the self-similar shape can be utilize. In the embodiment, the main portion 210 as apart of one radiating element having a self-similar shape is disposed to face the ground, thereby to achieve the substantially same operational effects as the bow-tie antenna in a pseudo manner, and to achieve, due to the ground, an operational effect as if another radiating element is virtually disposed on an opposite side.

In the embodiment, a part of the first extension portion 220 extends from the outer edge of the substrate 100 toward the inside of the substrate 100 (the negative direction of the second direction Y). This further contributes to a high frequency band in an operation frequency band, and deterioration of isolation caused by closely disposing the first antenna 200 and the second antenna 300 can be restrained.

At least one branch portion 230 branches from the first extension portion 220 at a tip of the first extension portion 220 (an end of the first extension portion 220 on a rear side of the antenna device 10). Specifically, at least one branch portion 230 extends from a portion of the first extension portion 220 extending along the outer edge of the substrate 100 along the second direction Y toward the front of the antenna device 10 along the first direction X. Thus, the operation band can be further widened. As many resonances as the number of branch portions 230 can be realized by providing a plurality of branch portions 230. Accordingly, in the embodiment, two branch portions 230 are provided, and two resonances are realized. According to such a configuration, the operation band can be further widened. The number of branch portions 230 is not limited to a specific number, and may be only one or may be plural.

Although the branch portion 230 in the embodiment has a shape extending linearly from the first extension portion 220 in the first direction X, the shape of the branch portion 230 is not limited to the linear shape, and may be other shapes, such as a meandering shape, a fractal shape, a folded shape, a curved shape, and a spiral shape.

While the main portion 210 of the first conductive pattern 202 overlaps the ground plate 600 in the third direction Z, at least one branch portion 230 of the first conductive pattern 202 does not overlap the ground plate 600 in the third direction Z. Specifically, at least one branch portion 230 overlaps the notch 610 of the ground plate 600 (a portion where the ground plate 600 is not physically present due to the notch 610) in the third direction Z. When the entire first antenna 200 is disposed not to overlap the ground plate 600 with consideration of an influence of the ground plate 600 on the radiation characteristics or a Voltage Standing Wave Ratio (VSWR) of the first antenna 200, a length in the first direction X and a length in the second direction Y of the antenna device 10 are extended, and the antenna device 10 increases in size. On the other hand, as in the embodiment, when the main portion 210 of the first conductive pattern 202 overlaps the ground plate 600, and the branch portions 230 of the first conductive pattern 202 do not overlap the ground plate 600 in the first antenna 200, desired characteristics of the first antenna 200 can be realized while reducing the size of the antenna device 10.

According to the configuration of the embodiment, the branch portions 230 can be less influenced by a current generated in the ground plate 600 at the time of feed to the first antenna 200, compared to when the branch portions 230 of the first conductive pattern 202 overlap the ground plate 600. On the other hand, as described below, the main portion 210 is short-circuited to the ground through the short-circuit portion 240, and a potential of the main portion 210 and the periphery of the main portion 210 of the first conductive pattern 202 is close to the ground. Accordingly, even though the main portion 210 overlaps the ground plate 600, the main portion 210 and the periphery of the main portion 210 of the first conductive pattern 202 are less influenced by the current generated in the ground plate 600 at the time of feed to the first antenna 200. In other words, the desired characteristics of the first antenna 200 can be realized without increasing the size of a structure (for example, the notch 610 of the ground plate 600) for making the ground plate 600 not overlap a portion (for example, a plurality of branch portions 230) of the first conductive pattern 202. That is, the desired characteristics of the first antenna 200 can be realized without further decreasing the area of the ground plate 600. The absence of necessity to further decrease the area of the ground plate 600 can prevent electrical characteristics from becoming unstable due to a leaking current flowing into a cable or the like in a low frequency band.

In the embodiment, the entire main portion 210 of the first conductive pattern 202 overlaps the ground plate 600. Note that only a portion of the main portion 210 of the first conductive pattern 202 (for example, 50% or more or 75% or more of the total area of the main portion 210 of the first conductive pattern 202 as viewed from the third direction Z) may overlap the ground plate 600. That is, at least a portion of the main portion 210 of the first conductive Pattern 202 (the whole or a portion of the main portion 210 of the first conductive pattern 202) may overlap the ground plate 600.

The short-circuit portion 240 extends from the main portion 210. The short-circuit portion 240 is electrically connected to the first terminal 110*a* (FIG. 2) of the substrate 100 through first wiring 120*a* (FIG. 4) positioned on the second surface 104 side of the substrate 100. The short-circuit portion 240 is short-circuited to the ground. A current distribution of the first conductive pattern 202 can be controlled depending on a position where the short-circuit portion 240 is connected to the main portion 210. That is, impedance matching is conducted based on the position where the short-circuit portion 240 is connected to the main portion 210. This can improve the VSWR in the operation frequency band of the first antenna 200, and as a result, can improve the radiation efficiency of the first antenna 200. In the embodiment, the short-circuit portion 240 is connected to an outer edge of the main portion 210 facing a side on which the second antenna 300 is positioned.

The second antenna 300 is an antenna conducting reception of radio waves. That is, the second antenna 300 does not conduct transmission of radio waves. Accordingly, the intensity of radio waves propagating near the second antenna 300 is lower than the intensity of radio waves propagating near the first antenna 200. In the embodiment, the second antenna 300 is an antenna for telephone, and more specifically, a sub-antenna for telephone. Note that the second antenna 300 may be an antenna for a purpose different from telephone.

The second antenna 300 has a second conductive pattern 302. The second conductive pattern 302 is provided on the first surface 102 side of the substrate 100. Note that the second conductive pattern 302 may be provided at a place of the substrate 100 different from the first surface 102 side of the substrate 100.

The second conductive pattern 302 (second antenna 300) has a second extension portion 310. The second extension portion 310 extends linearly along the outer edge of the substrate 100 except for both end portions of the second extension portion 310. One end portion of the second extension portion 310 on the rear side of the antenna device 10 has a portion extending linearly from a portion of the second extension portion 310 extending along the outer edge of the substrate 100 toward along the second direction Y a side on which the first antenna 200 is positioned, and a portion extending linearly from the portion (the portion extending linearly from the portion of the second extension portion 310 extending along the outer edge of the substrate 100 toward along the second direction Y the side on which the first antenna 200 is positioned) toward along the first direction X the front side of the antenna device 10. This can increase the total length of the second extension portion 310 while securing isolation between the first antenna 200 and the second antenna 300. The other end portion of the second extension portion 310 on the front side of the antenna device 10 extends linearly toward along the second direction Y the side on which the first antenna 200 is positioned. In this case, the total length of the second extension portion 310 can be increased without widening the second antenna 300 to the rear of the antenna device 10 compared to when the other end portion of the second extension portion 310 on the front side of the antenna device 10 is not provided. The length in the second direction Y of the other end portion of the second extension portion 310 needs to be adjusted such that the other end portion of the second extension portion 310 is not short-circuited to the ground of the substrate 100.

The other end portion of the second extension portion 310 on the front side of the antenna device 10 is electrically connected to the second terminal 110*b* (FIG. 2) of the substrate 100 through second wiring 120*b* (FIG. 4) positioned on the second surface 104 side of the substrate 100.

As shown in FIG. 3, as viewed from a direction (third direction Z) perpendicular to the first surface 102 of the substrate 100, a center point CP of the third antenna 400 is positioned on the same side as an end portion EP2 of the second antenna 300 furthest from the first antenna 200, relative to a center line CL passing through along the first direction X a center of a line L connecting an end portion EP1 of the first antenna 200 furthest from the second antenna 300 and the end portion EP2 of the second antenna 300 furthest from the first antenna 200. The end portion EP1 of the first antenna 200 is positioned at the center in the first direction X of an end region ER1 of the first antenna 200. The end region ER1 of the first antenna 200 extends in the first direction X and is furthest from the second antenna 300 (for example, an end region ER2 described below of the second antenna 300) in the second direction Y. The end portion EP2 of the second antenna 300 is positioned at the center in the first direction X of the end region ER2 of the second antenna 300. The end region ER2 of the second antenna 300 extends in the first direction X and is furthest from the first antenna 200 (for example, the end region ER1 of the first antenna 200) in the second direction Y. A method of deciding the end portion EP1 of the first antenna 200 and the end portion EP2 of the second antenna 300 is not limited to the above-described example. For example, even if any portion within the end region ER1 of the first antenna 200 (for example, a portion displaced from the center of the end region ER1 of the first antenna 200 in the first direction X) is the end portion EP1 of the first antenna 200, and any portion within the end region ER2 of the second antenna 300 (for example, a portion displaced from the center of the end region ER2 of the second antenna 300 in the first direction X) is the end portion EP2 of the second antenna 300, a position of the center of the line L, that is, a position of the center line CL remains constant. In the embodiment, the center line CL is also a center line of the first surface 102 of the substrate 100. Note that, in the above-described example, the center line CL may be displaced from the center line of the first surface 102 of the substrate 100 along the second direction Y.

At least a portion of the first antenna 200 (for example, the whole of the main portion 210 and a portion of the first extension Portion 220) and at least a portion of the second antenna 300 (for example, the whole of the second antenna 300) are positioned on opposite sides relative to the center line CL of the first surface 102 of the substrate 100 in the second direction Y. In the embodiment, as viewed from the front of the antenna device 10, the at least a portion of the first antenna 200 is positioned on (closer to) a right side of the center line CL of the first surface 102 of the substrate 100, and the at least a portion of the second antenna 300 is positioned on (closer to) a left side of the center line CL of the first surface 102 of the substrate 100. Note that, as viewed from the front of the antenna device 10, the at least a portion of the first antenna 200 may be positioned on the left side of the center line CL of the first surface 102 of the substrate 100, and the at least a portion of the second antenna 300 may be positioned on the right side of the center line CL of the first surface 102 of the substrate 100.

The center line CL of the first surface 102 of the substrate 100 passes through the center of the first surface 102 of the substrate 100 along the first direction X. In an example, the center of the first surface 102 of the substrate 100 is the center of gravity of the substrate 100, assuming that the substrate 100 has uniform density regardless of a position within the substrate 100.

The arrangement of the first antenna 200 and the second antenna 300 may be as follows. That is, the center of gravity of the first antenna 200 assuming that the first antenna 200 has uniform density regardless of a position within the first antenna 200 and the center of gravity of the second antenna 300 assuming that the second antenna 300 has uniform density regardless of a position within the second antenna 300 may be positioned on opposite sides in the second direction Y relative to the center line CL of the first surface 102 of the substrate 100.

The first antenna 200 and the second antenna 300 are formed by patterning, such as lithography. Accordingly, compared to when the first antenna 200 and the second antenna 300 are formed of sheet metal, the dimensional precision of the first antenna 200 and the second antenna 300 is improved and antenna characteristics are improved.

In addition, compared to when the first antenna 200 and the second antenna 300 are formed of sheet metal, a structure for holding the first antenna 200 of sheet metal and the second antenna 300 of sheet metal or solder for connecting the substrate 100 and the first antenna 200 of sheet metal or the second antenna 300 of sheet metal is not needed. Thus, a step of soldering is not needed, and step reduction or defect occurrence suppression is possible. Additionally, a reduction in the number of components or a reduction in the number of steps can reduce a cost.

In the embodiment, the third antenna 400 is an antenna for Global Navigation Satellite System (GNSS), such as an antenna for Global Positioning System (GPS). Note that the third antenna 400 may be an antenna for a purpose different from GNSS.

The third antenna 400 is positioned on the first surface 102 of the substrate 100. The third antenna 400 is a patch antenna. As viewed from a direction perpendicular to the first surface 102 of the substrate 100, the shape of the third antenna 400 is a quadrangular shape, and specifically, a substantially square shape. Note that the shape of the third antenna 400 may be a shape other than the quadrangular shape, and for example, may be a circular shape. A first feed point 402 and a second feed point 404 of the third antenna 400 are electrically connected to the third terminal 110*c* and the fourth terminal 110*d* (FIG. 2), respectively.

As viewed from the direction (third direction Z) perpendicular to the first surface of the substrate 100, a center point CP of the third antenna 400 is positioned on (closer to) the at least a portion of the second antenna 300 side relative to the center line CL of the first surface 102 of the substrate 100. As described above, the intensity of the radio waves propagating near the second antenna 300 is lower than the intensity of the radio waves propagating near the first antenna 200. Accordingly, in the embodiment, compared to when the center point CP of the third antenna 400 is positioned on the center line CL of the first surface 102 of the substrate 100 or when the center point CP of the third antenna 400 is positioned on the same side as the at least a portion of the first antenna 200 relative to the center line CL of the first surface 102 of the substrate 100, an inclination of the radiation directivity of the third antenna 400 from a zenithal direction (the positive direction of the third direction Z) can be reduced, and the radiation directivity of the third antenna 400 cam be improved.

The inclination of the radiation directivity of the third antenna 400 from the zenithal direction (the positive direction of the third direction Z) can be reduced even when the center line CL is not the center line of the first surface 102 of the substrate 100, but the center line passing through the center of the line L. That is, in the embodiment, the center line of the first surface 102 of the substrate 100 and the center line passing through the center of the line L coincide with each other as the center line CL. Note that depending on the shape of the substrate 100 and the arrangement of the first antenna 200 and the second antenna 300 (for example, one of the first antenna 200 and the second antenna 300 is close to the center of the first surface 102 of the substrate 100 in the second direction Y compared to the embodiment), the center line of the first surface 102 of the substrate 100 and the center line passing through the center of the line L may be displaced along the second direction Y. Even in this case, when the center point CP of the third antenna 400 is positioned on the same side as the end portion EP2 of the second antenna 300 relative to the center line passing through the center of the line L, the inclination of the radiation directivity of the third antenna 400 from the zenithal direction (the positive direction of the third direction Z) can be reduced, and the radiation directivity of the third antenna 400 can be improved.

The center point CP of the third antenna 400 is, for example, the center of gravity of the third antenna 400 assuming that the third antenna 400 has uniform regardless of a position within the third antenna 400.

In the embodiment, the whole of the third antenna 400 is positioned on (closer to) the same side as the at least a portion of the second antenna 300 relative to the center line CL of the first surface 102 of the substrate 100. Note that only a portion of the third antenna 400 (for example, 50% or more or 75% or more of the total area of the third antenna 400 as viewed from the third direction Z) may be positioned on the same side as the at least a portion of the second antenna 300 relative to the center line CL of the first surface 102 of the substrate 100. How much to displace the third antenna 400 relative to the center line CL of the first surface 102 of the substrate 100 may be determined, for example, depending on the intensity of the radio waves propagating near the first antenna 200 and the second antenna 300 by the first antenna 200 and the second antenna 300.

In the embodiment, as described above, the first antenna 200 and the second antenna 300 have the first conductive pattern 202 and the second conductive pattern 302, respectively. In this case, compared to when the first antenna 200 or the second antenna 300 is formed of sheet metal and is held apart from the first surface 102 of the substrate 100 upward of the antenna device 10 (the positive direction of the third direction Z), the position of the first antenna 200 and the position of the second antenna 300 in the third direction Z can be lower. The radiation directivity of the third antenna 400 in the zenithal direction (the positive direction of the third direction Z) can be less influenced by the first antenna 200 or the second antenna 300, and the radiation directivity of the third antenna 400 can be improved. Note that the first antenna 200 or the second antenna 300 may be formed of sheet metal.

In the embodiment, the fourth antenna 500 (a helical antenna 530 described below) is an antenna for Electronic Toll Collection (ETC). Note that the fourth antenna 500 may be an antenna for a purpose different from ETC.

The fourth antenna 500 has a conductive plate 510, a support part 520, and a helical antenna 530.

The conductive plate 510 is provided on the first surface 102 side of the substrate 100. The conductive plate 510 has a first portion 512 and a second portion 514. The first portion 512 of the conductive plate 510 is provided along the first surface 102 of the substrate 100. In other words, a normal line of the first portion 512 of the conductive plate 510 is parallel to a normal line (third direction Z) of the first surface 102 of the substrate 100. The second portion 514 of the conductive plate 510 is inclined at a first predetermined angle relative to the first surface 102 of the substrate 100 toward a predetermined side (a side in the positive direction of the first direction X, that is, the front side of the fourth antenna 500). In other words, a normal line of the second portion 514 of the conductive plate 510 is inclined at the first predetermined angle relative to the normal line of the first surface 102 of the substrate 100. In the embodiment, the first predetermined angle is about 23 degrees toward the positive direction of the first direction X, with the positive direction of the third direction Z being 0 degree. Alternatively, the first predetermined angle is about 23 degrees toward the positive direction of the third direction Z, with the negative direction of the first direction X being 0 degree. Note that the first predetermined angle is not limited thereto and may be a desired angle. The support part 520 is arranged on the conductive plate 510. The helical antenna 530 is provided by the support part 520 with the helical antenna 530 inclined at a second predetermined angle relative to the first surface 102 of the substrate 100 from the first surface 102 of the substrate 100 toward a side on which the second portion 514 of the conductive plate 510 is inclined (the side in the positive direction of the first direction X, that is, the front side of the fourth antenna 500). In other words, the axis of the helical antenna 530 (a winding portion 532 described below) is inclined at the second predetermined angle relative to the normal line (the positive direction of the third direction Z) of the first surface 102 of the substrate 100.

The first predetermined angle and the second predetermined angle are preferably substantially equal to each other. For example, the second predetermined angle is equal to or greater than 95% and equal to or less than 105% of the first predetermined angle. Note that the first predetermined angle and the second predetermined angle may be different from each other.

In the embodiment, compared to when the whole of the conductive plate 510 is inclined from the first surface 102 of the substrate 100, the helical antenna 530 be stably inclined obliquely at the second predetermined angle from a direction parallel to the first surface 102 of the substrate 100 (a direction along a plane extending along both the first direction X and the second direction Y) using a portion (that is, the first portion 512) of the conductive plate 510 parallel to the first surface 102 of the substrate 100. Specifically, the first portion 512 of the conductive plate 510 has a first hole portion 542. A fixing member (for example, a screw or a bolt) to fix the support part 520 to the substrate 100 or a guide member (for example, a guide pin for positioning) to align the support part 520 relative to the substrate 100 can pass through the first hole portion 542. The fixing member and the guide member pass through the substrate 100 from the second surface 104 toward the first surface 102 of the substrate 100, further pass through the first hole portion 542 of the first portion 512 of the conductive plate 510, and are inserted into the support part 520. Accordingly, the support part 520 can be stably fixed to the substrate 100 with the fixing member. Furthermore, the support part 520 can be stably aligned relative to the substrate 100 with the guide member. In the embodiment, a plurality of first hole portions 542 (three first hole portions 542) arranged in the second direction Y are provided. In this case, for example, the guide member can be used in two first hole portions 542 of the three first hole portions 542 (for example, two first hole portions 542 on both sides of the three first hole portions 542), and the fixing member can be used in remaining one first hole portion 542 (for example, the first hole portion 542 at the center of the three first hole portions 542). Accordingly, the support part 520 can be stably fixed to the substrate 100 compared to when the number of first hole portions 542 is one. Furthermore, when the fixing member and the guide member are used, the support part 520 and the substrate 100 are reliably positioned, and the support part 520 and the substrate 100 can be stably fixed. Note that the number of first hole portions 542 may be only one.

The conductive plate 510 is sheet metal. A portion of the conductive plate 510 between the first portion 512 and the second portion 514 is bent. Accordingly, the conductive plate 510 is easily manufactured compared to when the first portion 512 and the second portion 514 of the conductive plate 510 are joined by, for example, welding. Note that the conductive plate 510 may be manufactured by joining the first portion 512 and the second portion 514 of the conductive plate 510 by, for example, welding.

The conductive plate 510 is not electrically connected to (hereinafter "in non-conduction with") the ground plate 600. In other words, the conductive plate 510 is electrically floating from the ground plate 600. That is, when the conductive plate 510 and the ground plate 600 are brought into direct contact with each other, there is a need to conduct fixing with a bolt, a screw, or the like or fixing through soldering, welding, or the like to bring a metal portion of the conductive plate 510 and a metal portion of the ground plate 600 into conduction. When the conductive plate 510 and the ground plate 600 are in a floating state physically and electrically, however, the conductive plate 510 and the ground plate 600 are easily attached, and fixing means or the like is not needed. Note that, even though the conductive plate 510 and the ground plate 600 are in the floating state physically and electrically, the conductive plate 510 and the ground plate 600 seem to be in conduction through capacitive coupling at a high frequency. In an example, static capacitance between the conductive plate 510 and the ground plate 600 is equal to or greater than 20 pF, preferably, equal to or greater than 20 pF and equal to or smaller than 100 pF, and more preferably, equal to or greater than 20 pF and equal to or smaller than 45 pF.

The support part 520 is made of an insulating material (for example, resin). A bottom surface 522 of the support part 520 has a first bottom surface portion 522*a* and a second bottom surface portion 522*b*. The first bottom surface portion 522*a* is along the first portion 512 of the conductive plate 510. The second bottom surface portion 522*b* is along the second portion 514 of the conductive plate 510. In other words, the second bottom surface portion 522*b* is a portion inclined at the first predetermined angle from the first surface 102 of the substrate 100. Accordingly, alignment of the support part 520 relative to the second portion 514 of the conductive plate 510 is easily conducted with the second bottom surface portion 522*b*. In addition, alignment of the support part 520 relative to the first portion 512 and the second portion 514 of the conductive plate 510 is easily conducted with both the first bottom surface portion 522*a* and the second bottom surface portion 522*b*. The support Part 520 may not have the first bottom surface portion 522*a*.

The conductive plate 510 is provided with a plurality of first engaging portions 552 (first engaging portion 552*a* and first engaging portion 552*b*). The first engaging portion 552*a* is provided in the first portion 512 of the conductive plate 510 and is positioned on a front side (a side in the positive direction of the first direction X) of the conductive plate 510. The first engaging portion 552*b* is provided in the second portion 514 and is positioned on a rear side (a side in the negative direction of the first direction X) of the conductive plate 510. In the embodiment, each of a plurality of first engaging portions 552 is a portion of the conductive plate 510. That is, a portion of the conductive plate 510 between the first portion 512 and the first engaging portion 552*a* is bent from a direction (the positive direction of the first direction X) parallel to the first portion 512 upward of the fourth antenna 500 (the positive direction of the third direction Z) across the first portion 512 and the first engaging portion 552*a*. A portion of the conductive plate 510 between the second portion 514 and the first engaging portion 552*b* is bent from a direction (a diagonal direction from the negative direction of the first direction X toward the positive direction of the third direction Z) parallel to the second portion 514 upward of the fourth antenna 500 (the positive direction of the third direction Z) across the second portion 514 and the first engaging portion 552*b*. Note that each of a plurality of first engaging portions 552 may not be a portion of the conductive plate 510. For example, the first engaging portions 552 may be formed of a material different from or the same material as the conductive plate 510 or may be joined to the conductive plate 510.

In the embodiment, the first engaging portion 552*b* has a shape extending from the second portion 514 of the conductive plate 510 and bent toward the positive direction of the third direction Z. The directivity of the helical antenna 530 can be adjusted depending on a bending angle or a length of the bent portion.

The support part 520 is provided with a plurality of second engaging portions 554 (second engaging portion 554*a* and second engaging portion 554*b*). The second engaging portion 554*a* is positioned on a front side (a side in the positive direction of the first direction X) of the support part 520. The second engaging portion 554*b* is positioned on a rear side (a side in the negative direction of the first direction X) of the support part 520. A plurality of second engaging portions 554 are a portion of the support part 520. A plurality of second engaging portions 554 may be formed integrally with the support part 520. At least a part of a plurality of second engaging portions 554 may be formed separately from the support part 520 and may be connected by various methods.

The second engaging portion 554*a* and the second engaging portion 554*b* of the support part 520 are engageable with the first engaging Portion 552*a* and the first engaging portion 552*b* of the conductive plate 510, respectively. Accordingly, after the support part 520 is aligned relative to the conductive plate 510 as appropriate by engaging the second engaging portion 554*a* and the second engaging portion 554*b* of the support part 520 with the first engaging portion 552*a* and the first engaging portion 552*b* of the conductive plate 510, respectively, the helical antenna 530 can be supported by the support part 520. If the first engaging portions 552 of the conductive plate 510 and the second engaging portions 554 of the support part 520 are not provided, there is a need to conduct alignment of the support part 520 relative to the conductive plate 510 and alignment of the helical antenna 530 relative to the conductive plate 510 simultaneously, and work becomes complicated. In contrast, in the embodiment, as described above, the work of attaching the helical antenna 530 is simplified. Assembly of the conductive plate 510, the support part 520, and the helical antenna 530, as in the embodiment, simplifies the work of attaching the helical antenna 530 to the substrate 100.

In the embodiment, a plurality of first engaging portions 552 are provided in the conductive plate 510, and a plurality of second engaging portions 554 are provided in the support part 520. Note that the number of first engaging portions 552 provided in the conductive plate 510 may be only one, and the number of second engaging portions 554 provided in the support part 520 may be only one. The first engaging portions 552 of the conductive plate 510 and the second engaging portions 554 of the support part 520 may not be provided.

In the embodiment, the second engaging portions 554 of the support part 520 have a protrusion shape, and the first engaging Portions 552 of the conductive plate 510 have a recess (opening) shape into which the protrusion shape of the second engaging portions 554 is inserted. Thus, the second engaging portions 554 of the support part 520 is engageable with the first engaging portions 552 of the conductive plate 510. Note that a structure for engaging the first engaging portions 552 of the conductive plate 510 and the second engaging portions 554 of the support part 520 is not limited to the example in the embodiment. For example, the first engaging portions 552 of the conductive plate 510 may have a protrusion shape, and the second engaging portions 554 of the support part 520 may have a recess (opening) shape into which the protrusion shape of the first engaging portions 552 is inserted.

The support part 520 has a first protrusion portion 562*a*, a second protrusion portion 562*b*, a third protrusion portion 562*c*, and a fourth protrusion portion 562*d*. The first protrusion portion 562*a*, the second protrusion portion 562*b*, the third protrusion portion 562*c*, and the fourth protrusion portion 562*d* protrude upward (the positive direction of the third direction Z) from the bottom surface 522 of the support part 520. The first protrusion portion 562*a* is positioned on a front side (a side in the positive direction of the first direction X) of the support part 520. The second protrusion portion 562*b* faces the first protrusion portion 562*a* in the first direction X and is positioned on a rear side (a side in the negative direction of the first direction X) of the support part 520. The third protrusion portion 562*c* is positioned on a right side (a side in the positive direction of the second direction Y) of the support part 520 as viewed from the front of the support part 520. The fourth protrusion portion 562*d* is positioned on a left side (a side in the negative direction of the second direction Y) of the support part 520 as viewed from the front of the support part 520. The third protrusion portion 562*c* and the fourth protrusion portion 562*d* face in the second direction Y.

The helical antenna 530 has a winding portion 532, a first end portion 534, and a second end portion 536. The winding portion 532, the first end portion 534, and the second end portion 536 are made of a common conductive wire.

The winding portion 532 has a spiral shape. Specifically, the winding portion 532 extends in a circular shape as viewed from an axial direction of the winding portion 532 (as described above, the axis of the winding portion 532 is inclined obliquely from the normal line (the positive direction of the third direction Z) of the first surface 102 of the substrate 100 to the side in the positive direction of the first direction X). Note that the winding portion 532 may extend in a shape (for example, an elliptical shape or a quadrangular shape) different from the circle as viewed from the axial direction of the winding portion 532. A length of each winding of the winding portion 532 is decided depending on a wavelength of the fourth antenna 500. The directivity of the fourth antenna 500 can be enhanced as the number of windings of the winding portion 532 is greater.

The first end portion 534 is an end portion on an upper side (a side in the positive direction of the third direction Z) of the helical antenna 530. The first end portion 534 extends (not shown) in an extension direction of the winding portion 532. Alternatively, the first end portion 534 may extend in a direction different from the extension direction of the winding portion 532, and specifically, from the winding portion 532 toward the inside of the winding portion 532. In this case, an axial ratio of the fourth antenna 500 (helical antenna 530) can be adjusted depending on the length or orientation of the first end portion 534.

The second end portion 536 is an end portion on a lower side (a side in the negative direction of the third direction Z) of the helical antenna 530. The second end portion 536 extends from the winding portion 532 downward of the winding portion 532 (the negative direction of the third direction Z). The second end portion 536 passes through the support part 520, further passes through the second hole portion 544 of the conductive plate 510, and reaches the substrate 100. The second end portion 536 is electrically connected to the fifth terminal 110*e* (FIG. 2) of the substrate 100 through a stripline (not shown) of the substrate 100. Thus, the helical antenna 530 is fed. According to such a configuration, the helical antenna 530 can be easily fed without using a coaxial cable.

When the helical antenna 530 is supported by the support part 520, the winding portion 532 is positioned between the third protrusion portion 562*c* and the fourth protrusion portion 562*d* of the support part 520, the second protrusion portion 562*b* is positioned inside the winding portion 532, and the first protrusion portion 562*a* is positioned outside the winding portion 532. That is, the helical antenna 530 is supported in the first direction X by the first protrusion portion 562*a* and the second protrusion portion 562*b*, and the helical antenna 530 is supported in the second direction Y by the third protrusion portion 562*c* and the fourth protrusion portion 562*d*. The first end portion 534 of the helical antenna 530 is engaged with a third engaging portion 564 (recess portion) of the support part 520.

In the embodiment, the fourth antenna 500 is positioned on the front of the antenna device 10 relative to the third antenna 400. Note that the third antenna 400 may be positioned on the front of the antenna device 10 relative to the fourth antenna 500. That is, a positional relationship between the third antenna 400 and the fourth antenna 500 may be opposite to a positional relationship between the third antenna 400 and the fourth antenna 500 in the embodiment. In the embodiment, although the fourth antenna 500 is displaced to the side in the positive direction of the second direction Y (right side) relative to the third antenna 400, the fourth antenna 500 may be displaced to the side in the negative direction of the second direction Y (left side), or the fourth antenna 500 and the third antenna 400 may be positioned on a line along the first direction X.

Figure 6:
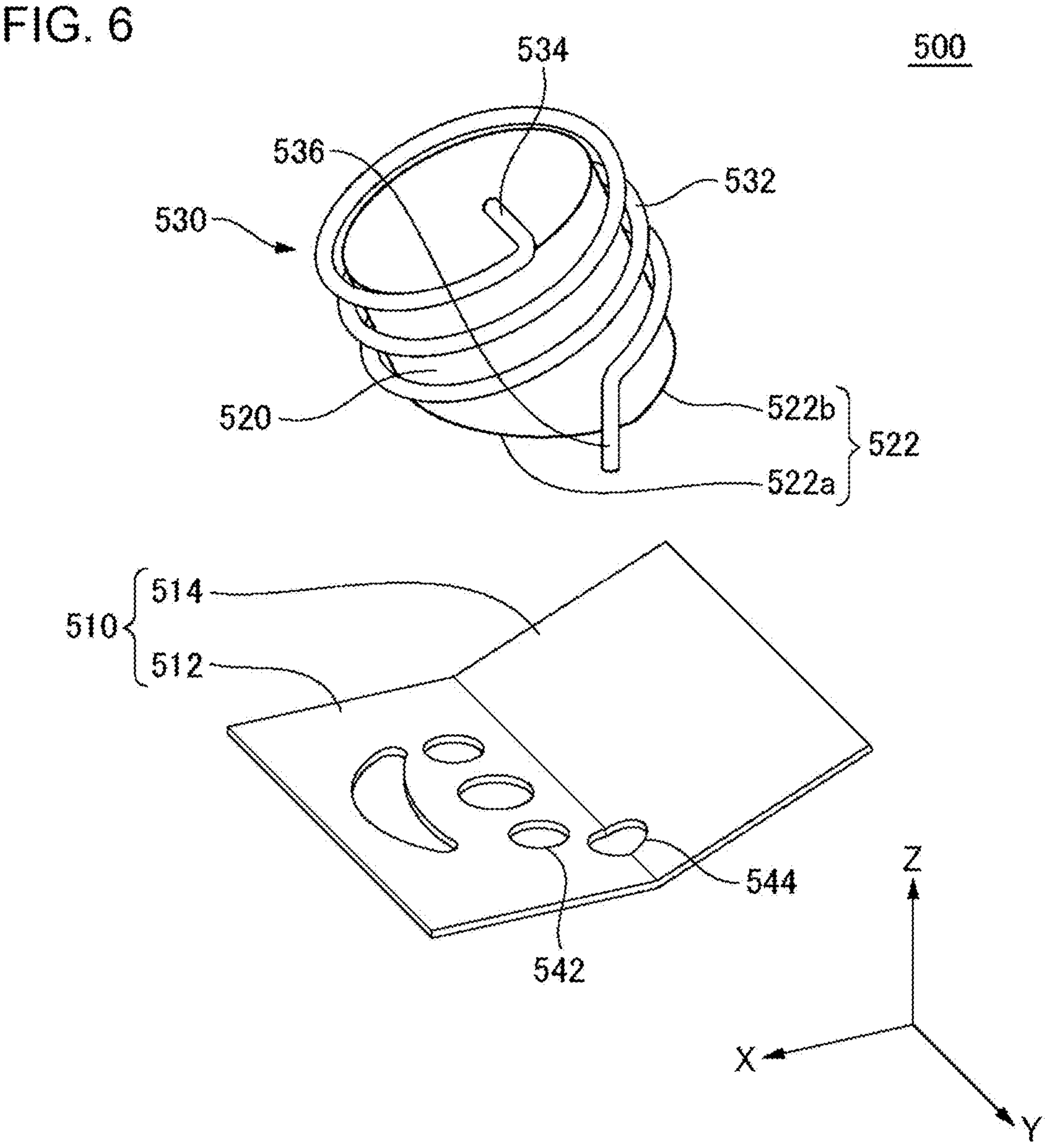
FIG. 6 is a diagram showing a modification example of FIG. 5.

FIG. 6 is a diagram showing a modification example of FIG. 5. A fourth antenna 500 shown in FIG. 6 is the same as the fourth antenna 500 shown in FIG. 5 except for the following points.

The winding portion 532 of the helical antenna 530 is wound around the support part 520. Thus, the helical antenna 530 is inclined obliquely from a horizontal direction. The support part 520 has a pillar shape, and specifically, has a columnar shape. The support part 520 is formed of, for example, hollow resin or solid resin. A bottom surface 522 of the support part 520 has a first bottom surface portion 522*a* and a second bottom surface portion 522*b*. The first bottom surface portion 522*a* of the bottom surface 522 is along the first portion 512 of the conductive plate 510. The second bottom surface portion 522*b* of the bottom surface 522 is along the second portion 514 of the conductive plate 510. Accordingly, alignment of the support part 520 relative to the conductive plate 510 is easily conducted.

Also in the example shown in FIG. 6, the fixing member (for example, a screw or a bolt) to fix the support part 520 to the substrate 100 passes through the substrate 100 from the second surface 104 of the substrate 100 toward the first surface 102, further passes through the first hole portion 542 of the first portion 512 of the conductive plate 510, and is inserted into the support part 520. Accordingly, the helical antenna 530 be stably inclined obliquely from the horizontal direction (the direction along the plane extending along both the first direction X and the second direction Y).

In the embodiment, although a configuration in which the helical antenna 530 is provided as an antenna element has been described, antennas with radiating elements having various shapes, such as a sheet-shaped radiating element, a plate-shaped radiating element, a meandering radiating element, a fractal radiating element, and a spiral radiating element, may be provided as an antenna element instead of the helical antenna 530 (that is, an antenna with a helical radiating element). A part (for example, an end) of an antenna element with the helical radiating element, the sheet-shaped radiating element, the plate-shaped radiating element, the meandering radiating element, the fractal radiating element, or the spiral radiating element is connected through a conductor to a stripline (not shown) provided on the substrate 100, and is electrically connected to the fifth terminal 110*e* (FIG. 2) of the substrate 100. Thus, the antenna element with the radiating element having the above-described shape is fed. Even in this case, as in the embodiment, the antenna element with the radiating element having the above-described shape can be easily fed without using a coaxial cable.

The conductor electrically connecting the radiating element having the above-described shape and the stripline may be configured with, for example, a linear conductor, a plate-shaped conductor, a sheet-shaped conductor, or a conductor pattern. The conductor may be a portion of the antenna element. For example, in the embodiment, the conductor may be the second end portion 536 of the helical antenna 530. In this case, the conductor is easily attached to the antenna element.

In the embodiment, although the ground plate 600, the substrate 100, the conductive plate 510, the support part 520, and the helical antenna 530 are arranged in this order toward the positive direction of the third direction Z in the fourth antenna 500, a different arrangement order may be applied. For example, the ground plate 600, the substrate 100, the support part 520, the conductive plate 510, and the helical antenna 530 may be arranged in this order. In this case, the support part 520 provided on the substrate 100 is in a shape holding the conductive plate 510 and the helical antenna 530. For example, a through-hole is provided in a portion of the conductive plate 510 facing the support part 520, and a protrusion portion is provided in a portion of the support part 520 facing the conductive plate 510, the protrusion portion provided in the support part 520 passes through the through-hole provided in the conductive plate 510, and the conductive plate 510 and the support part 520 are engaged. According to a configuration in which the protrusion portion of the support part 520 is engaged with a part of the helical antenna 530, the support part 520 supports the helical antenna 530. Alternatively, when the helical antenna 530 is the antenna element with the plate-shaped radiating element, the sheet-shaped radiating element, or the like, the support part 520 supports the antenna according to a configuration in which a hole portion is provided in at least a part of the antenna including the radiating element, and the protrusion portion of the support part 520 passes through the hole portion provided in a part of the antenna. The support part 520 and the substrate 100 are fixed by various methods, such as a fixing member (for example, a screw or a bolt). Even in such a configuration, the same operational effects as in the embodiment are realized according to a configuration in which the conductive plate 510 and the ground plate 600 seem to be in conduction through capacitive coupling at a high frequency as described above.

In the embodiment, although a configuration in which the conductive plate 510 and the ground plate 600 are floating physically and electrically has been described, a configuration in which the metal portions of the conductive plate 510 and the ground plate 600 are directly connected, that is, the conductive plate 510 and the ground plate 600 are brought into direct conduction with fixing by a screw, a bolt, or the like or fixing through soldering, welding, or the like. In this case, the directivity of the helical antenna 530 can be adjusted by adjusting an attachment height of the helical antenna 530.

In the embodiment, although an example where the first engaging portion 552*a* has a shape of being bent toward the positive direction of the third direction Z has been described, on the contrary, the first engaging portion 552*a* may have a shape of being bent toward the negative direction of the third direction Z, and the first engaging portion 552*a* may pass through and be fixed to a hole provided in the substrate 100

(the first engaging portion 552*a* may be inserted into the hole provided in the substrate). The first portion 512 of the conductive plate 510 may have a shorter distance in the first direction X than the second portion 514. Even in such a case, the substrate 100 and the conductive plate 510 are fixed, and the helical antenna 530 can be stably inclined while keeping the second predetermined angle.

In the embodiment, a third conductive pattern 130 is provided in the substrate 100. The third antenna 400 and the fourth antenna 500 are disposed on the third conductive pattern 130. The third conductive pattern 130 is electrically connected to a conductive screw 132 positioned between the first antenna 200 and the second antenna 300.

Figure 7:
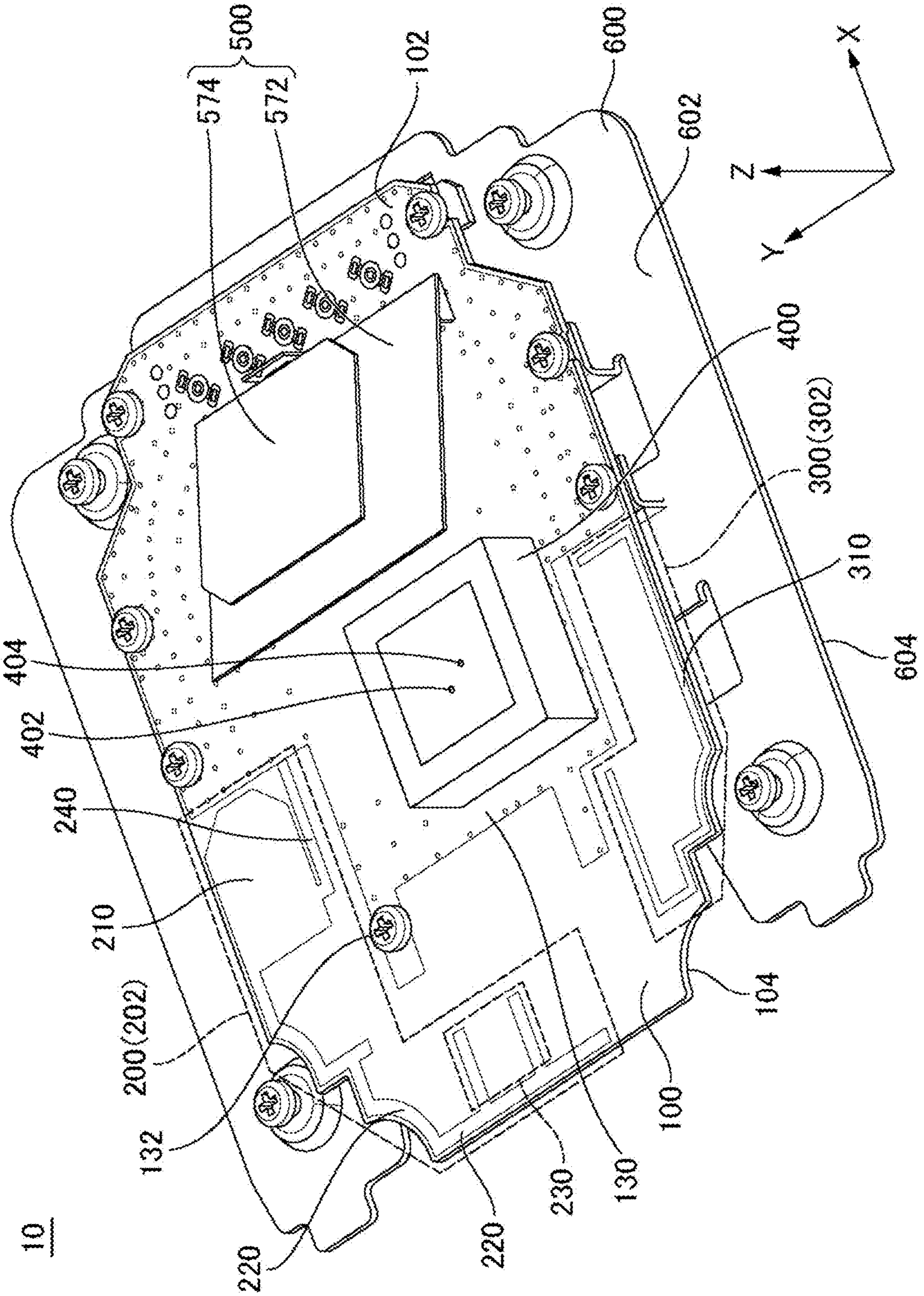
FIG. 7 is a diagram showing a first modification example of FIG. 1.

FIG. 7 is a diagram showing a first modification example of FIG. 1. An antenna device 10 shown in FIG. 7 is the same as the antenna device 10 shown in FIG. 1 except for the following points.

A fourth antenna 500 may be a patch antenna instead of a structure including the helical antenna 530 shown in FIG. 1. In the example shown in FIG. 7, the fourth antenna 500 has a base 572 and a radiating element 574. The base 572 is inclined at a first predetermined angle relative to the first surface 102 of the substrate 100 on a predetermined side (the side in the positive direction of the first direction X, that is, the front side of the fourth antenna 500). In other words, a normal line of the base 572 is inclined at the first predetermined angle relative to the normal line of the first surface 102 of the substrate 100. The radiating element 574 is positioned on the base 572. The base 572 may be configured with a substrate or may be configured with a metal plate.

Figure 8:
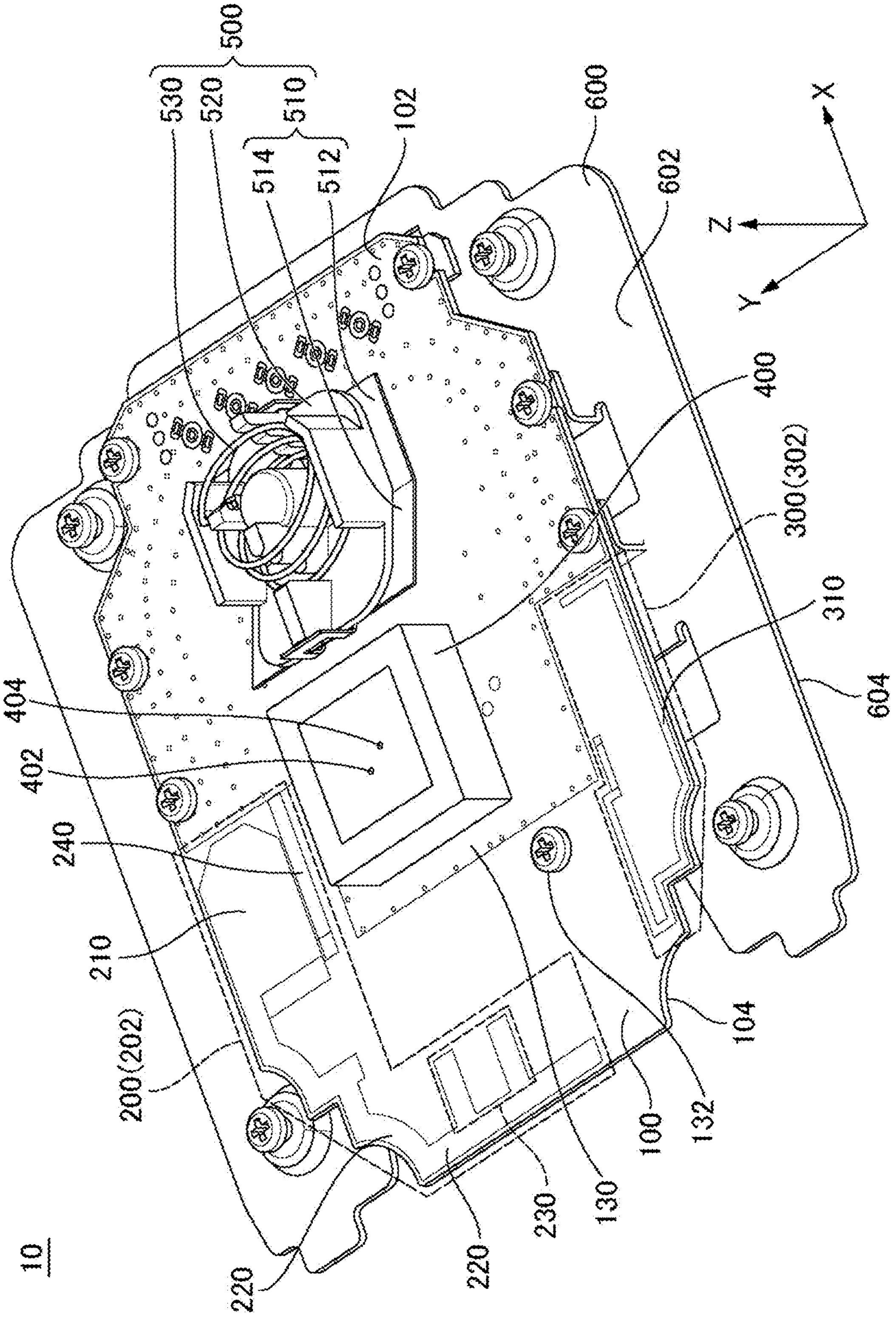
FIG. 8 is a diagram showing a second modification example of FIG. 1.

FIG. 8 is a diagram showing a second modification example of FIG. 1. An antenna device 10 shown in FIG. 8 is the same as the antenna device 10 shown in FIG. 1 except the following points.

A width of the first conductive pattern 202 in FIG. 8 is wider than a width of the first conductive pattern 202 in FIG. 1. According to such a configuration, as described referring to FIG. 9 described below, a gain of a comparatively low band of 700 MHz to 840 MHz in the antenna device 10 shown in FIG. 8 can be higher than a gain of a comparatively low band of 700 MHz to 840 MHz in the antenna device 10 shown in FIG. 1.

An interval in the second direction Y between the first antenna 200 and the second antenna 300 in FIG. 8 is greater than an interval in the second direction Y between the first antenna 200 and the second antenna 300 in FIG. 1. Accordingly, isolation between the first antenna 200 and the second antenna 300 can be secured better in the antenna device 10 shown in FIG. 8 than the antenna device 10 shown in FIG. 1.

In FIG. 8, the center of the third antenna 400 is positioned on a virtual line passing through the center of a fourth antenna 500 in parallel with the first direction X. As shown in FIG. 1, the center of the third antenna 400 may be displaced from the virtual line in the second direction Y. The center of the third antenna 400 is positioned on a virtual line passing through the center of the substrate 100 in parallel with the first direction X. As shown in FIG. 1, the center of the third antenna 400 may be displaced from the virtual line in the second direction Y.

In FIG. 8, the conductive screw 132 is positioned on the side in the negative direction of the second direction Y relative to the virtual line passing through the center of the fourth antenna 500 in parallel with the first direction X. The conductive screw 132 is spaced apart from the third conductive pattern 130.

Figure 9:
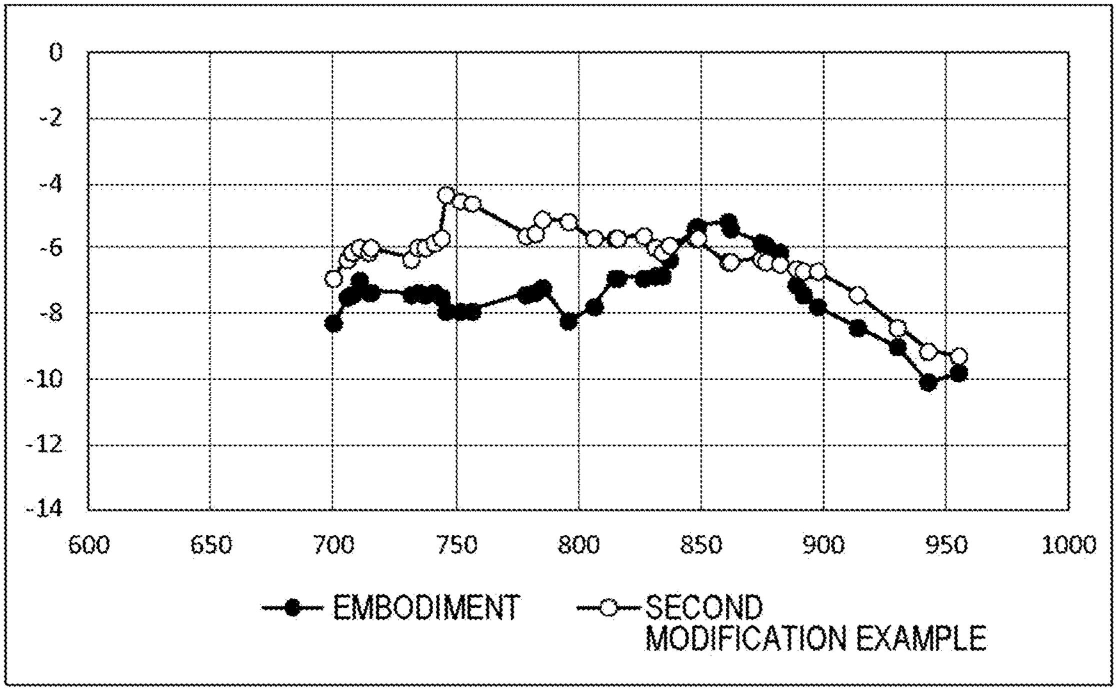
FIG. 9 is a graph showing frequency characteristics of a gain of an antenna device according to the second modification example and frequency characteristics of a gain of the antenna device according to the embodiment.

FIG. 9 is a graph showing frequency characteristics of a gain of the antenna device 10 according to the second modification example and frequency characteristics of a gain of the antenna device 10 according to the embodiment. In FIG. 9, the horizontal axis of the graph indicates a frequency (unit: MHz). The vertical axis of the graph indicates a gain (unit: dBi).

As shown in FIG. 9, a gain of a band of 700 MHz to 840 MHz in the second modification example is higher than a gain of a band of 700 MHz to 840 MHz in the embodiment. This result suggests that an increase in the width of the width of the first conductive pattern 202 of the first antenna 200 results in improvement of the gain of the band of 700 MHz to 800 MHz.

Figure 10:
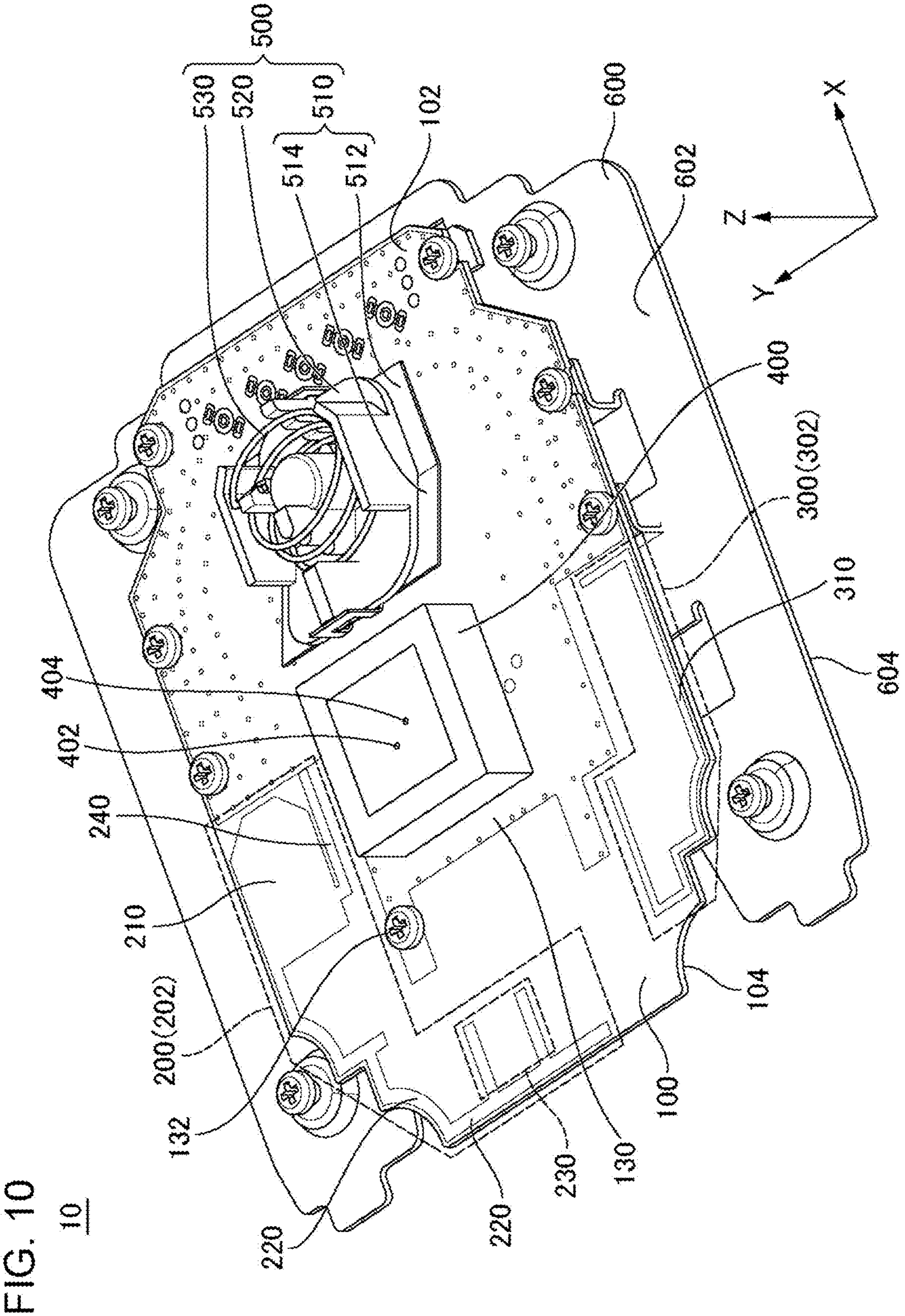
FIG. 10 is a diagram showing a third modification example of FIG. 1.

FIG. 10 is a diagram showing a third modification example of FIG. 1. An antenna device 10 shown in FIG. 10 is the same as the antenna device 10 shown in FIG. 1 except that the center of the third antenna 400 is positioned on a virtual line passing through the center of the substrate 100 in parallel with the first direction X.

Figure 11:
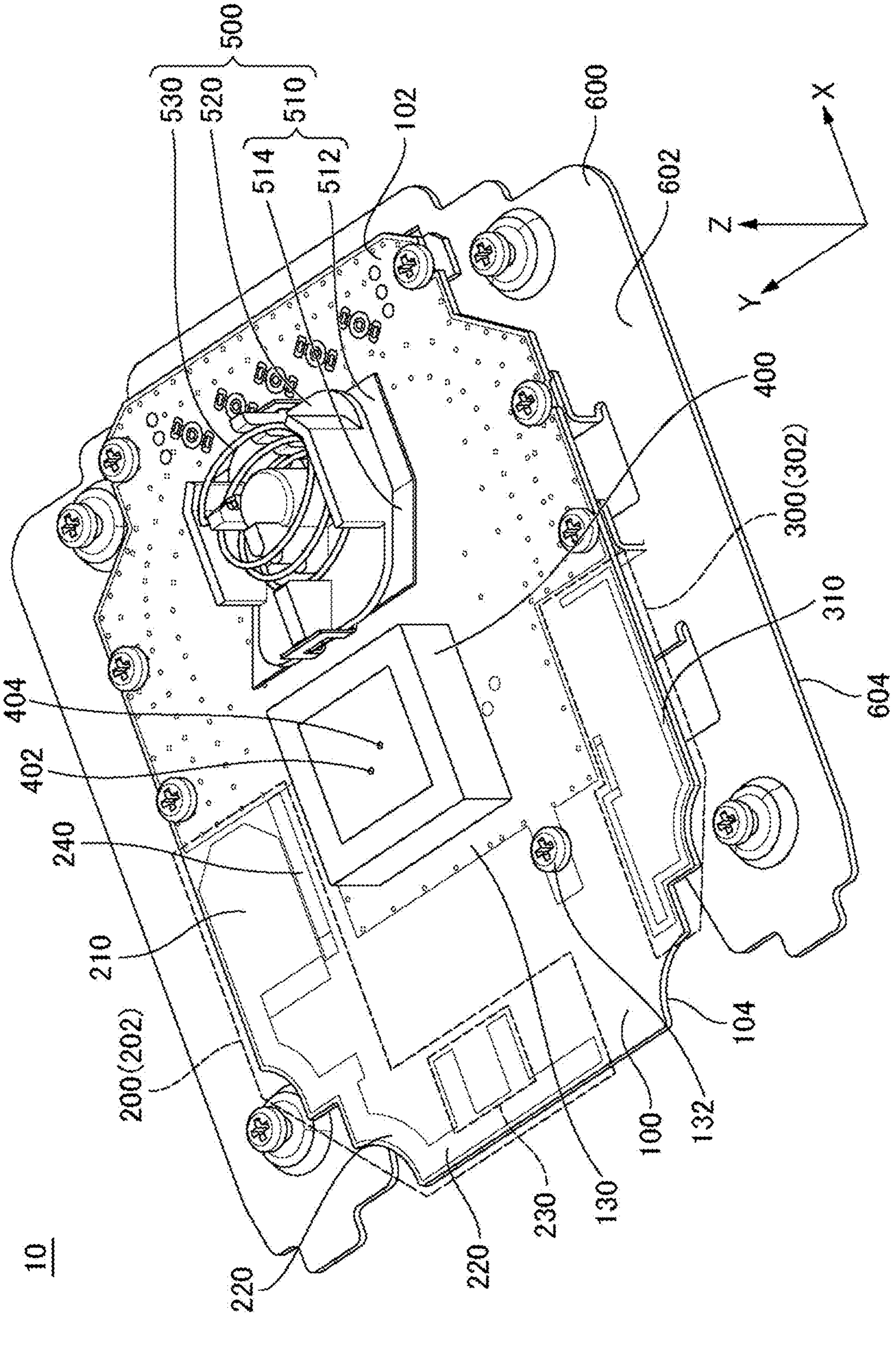
FIG. 11 is a diagram showing a fourth modification example of FIG. 1.

FIG. 11 is a diagram showing a fourth modification example of FIG. 1. An antenna device 10 shown in FIG. 11 is the same as the antenna device 10 shown in FIG. 8 except that the conductive screw 132 is connected to the third conductive pattern 130.

Figure 12:
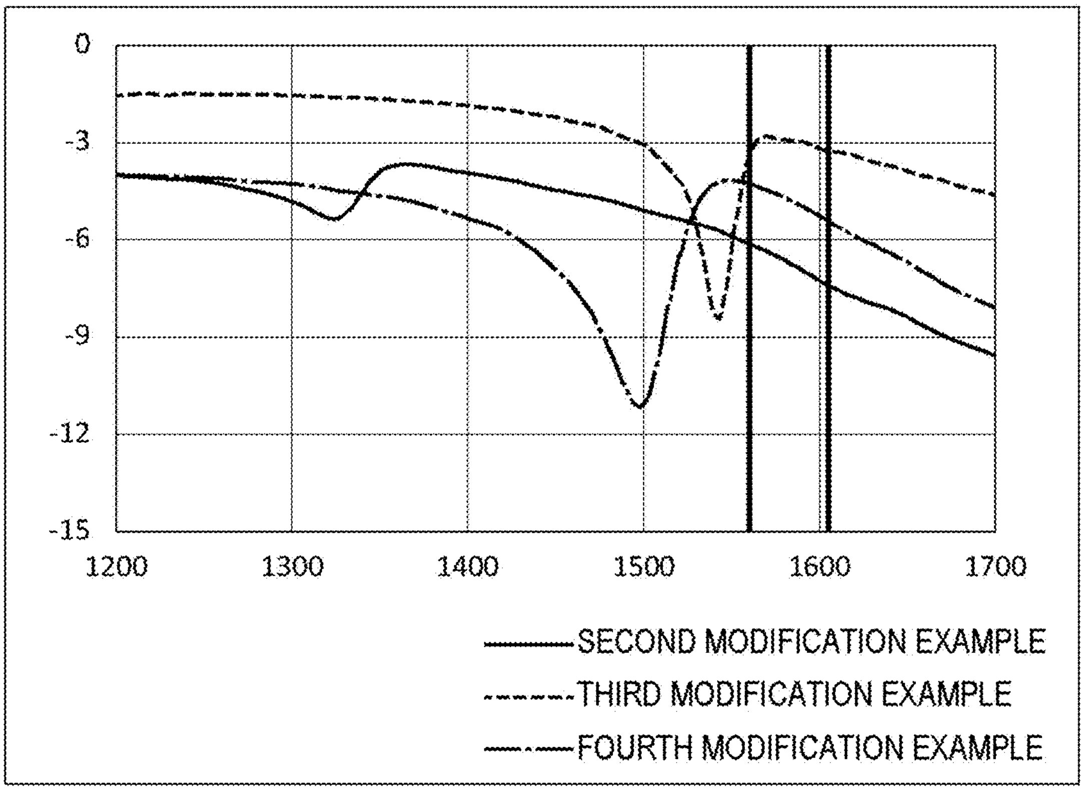
FIG. 12 is a graph showing frequency characteristics of reflection loss of the antenna device according to the second modification example, frequency characteristics of a reflection loss of an antenna device according to the third modification example, and frequency characteristics of a reflection loss of an antenna device according to the fourth modification example.

FIG. 12 is a graph showing frequency characteristics of a reflection loss of the antenna device 10 according to the second modification example, frequency characteristics of a reflection loss of the antenna device 10 according to the third modification example, and frequency characteristics of a reflection loss of the antenna device 10 according to the fourth modification example. In FIG. 12, the horizontal axis of the graph indicates a frequency (unit: MHz). The vertical axis of the graph indicates a reflection loss (unit: dB). A bold line drawn in parallel with the vertical axis of the graph at about 1550 MHz and a bold line drawn in parallel with the vertical axis of the graph at about 1600 HMz indicate that a region between the two bold lines is a GNSS band.

In the third modification example, there is a resonance portion where the reflection loss locally decreases near 1575 MHz. In contrast, in the fourth modification example, there is a resonance portion where the reflection loss locally decreases near 1500 MHz. From comparison of the results, when the conductive screw 132 is displaced to the side in the negative direction of the second direction Y rather than the side in the positive direction of the second direction Y relative to the virtual line passing through the center of the fourth antenna 500 in parallel with the first direction X, the resonance portion of the reflection loss can be away from the GNSS band. Considering that the relationship of the distance between the conductive screw 132 and the third antenna 400 is the same in the third modification example and the fourth modification example, the resonance portion of the reflection loss may be away from the GNSS band by increasing the distance between the main portion 210 of the first antenna 200 and the conductive screw 132. That is, resonance in the GNSS band can be suppressed by a configuration in which the conductive screw 132 is positioned on a side on which the second antenna 300 is positioned, rather than a side on which the main portion 210 of the first antenna 200 is positioned.

In the second modification example, there is a resonance portion where the reflection loss locally decreases near 1325 MHz. The decrease in reflection loss of the resonance portion in the second modification example is smaller than the decrease in reflection loss of the resonance portion in the third modification example and the decrease in reflection loss of the resonance portion in the fourth modification example. For this reason, resonance in the GNSS band can be suppressed when the conductive screw 132 is displaced to the side in the negative direction of the second direction Y rather than the side in the positive direction of the second direction Y relative to the virtual line passing through the center of the fourth antenna 500 in parallel with the first direction X, and the conductive screw 132 is spaced apart from the third conductive pattern 130 instead of being connected to the third conductive pattern 130. That is, when the conductive screw 132 is in non-conduction with the third conductive pattern 130, the resonance portion of the reflection loss in the GNSS band can be away from the GNSS band. In the third modification example, even if the conductive screw 132 and the third conductive pattern 130 are brought into non-conduction, the same effects can be obtained. That is, even if the conductive screw 132 is positioned on the side on which the main portion 210 of the first antenna 200 is positioned, the resonance portion of the reflection loss can be away from the GNSS band, and resonance in the GNSS band can be suppressed, according to a configuration in which the conductive screw 132 is spaced apart from the third conductive pattern 130.

Accordingly, when the conductive screw 132 is positioned on the same side as the end portion EP2 of the second antenna 300 furthest from the first antenna 200 relative to the center line CL described referring to FIG. 3, the oscillation of the third antenna 400 due to an influence of the conductive screw 132 can be suppressed compared to when the conductive screw 132 is positioned on the side opposite to the end portion EP2 of the second antenna 300 furthest from the first antenna 200 relative to the center line CL described referring to FIG. 3 or the center line of the first surface 102 (second surface 104) of the substrate 100.

When the conductive screw 132 is in non-conduction with a conductive pattern provided on the substrate 100, such as the third conductive pattern 130, the oscillation of the third antenna 400 due to an influence of the conductive screw 132 can be suppressed compared to when the conductive screw 132 is in conduction with a conductive pattern provided on the substrate 100, such as the third conductive pattern 130.

In FIG. 12, the suppression of the oscillation of the third antenna 400 due to the influence of the conductive screw 132 has been described. Note that the matter described referring to FIG. 12 is applicable to the suppression of the oscillation of the third antenna 400 due to not only the conductive screw 132 but also a metal-containing member, such as a vis, a pin, a bolt, a spring, or a holder, that is, a metal-containing member other than an antenna.

The metal-containing member other than an antenna is, for example, a member for attaching an antenna, a member for supporting an antenna, a member for adjusting an angle of an antenna, a member for fixing the substrate 100, a member for attaching the substrate 100, a member for supporting the substrate 100, or the like. Specifically, the metal-containing member is, for example, a screw, a vis, a pin, a bolt, or a spring made of metal or resin partially containing metal, a holder made of metal or resin partially containing metal, or the like. As the metal-containing member, not only one member described herein but also a plurality of members may be provided.

Figure 13:
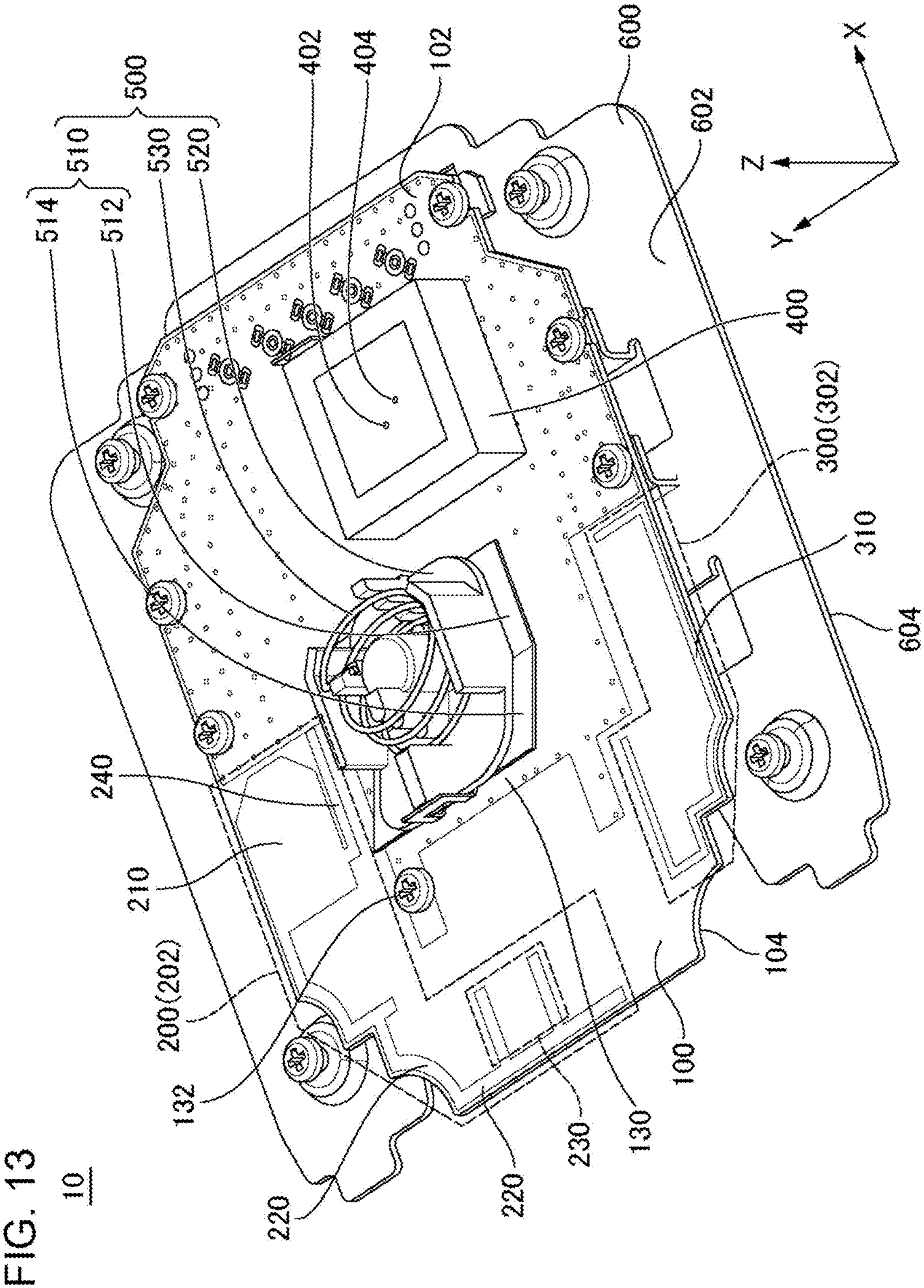
FIG. 13 is a diagram showing a fifth modification example of FIG. 1.

FIG. 13 is a diagram showing a fifth modification example of FIG. 1. An antenna device 10 shown in FIG. 13 is the same as the antenna device 10 shown in FIG. 1 except for the following points.

As shown in FIG. 13, the third antenna 400 may be positioned on the side in the positive direction of the first direction X of the fourth antenna 500. Specifically, in an example shown in FIG. 13, the third antenna 400 is positioned opposite to the second portion 514 of the conductive plate 510 across the first portion 512 of the conductive plate 510. The third antenna 400 is positioned between the first antenna 200 and the second antenna 300 in the second direction Y.

In the example shown in FIG. 13, the center of the third antenna 400 is displaced to the side in the negative direction of the second direction Y relative to the virtual line passing through the center of the fourth antenna 500 in parallel with the first direction X. Note that the center of the third antenna 400 may be positioned on the virtual line or may be displaced to the side in the positive direction of the second direction Y relative to the virtual line.

Figure 14:
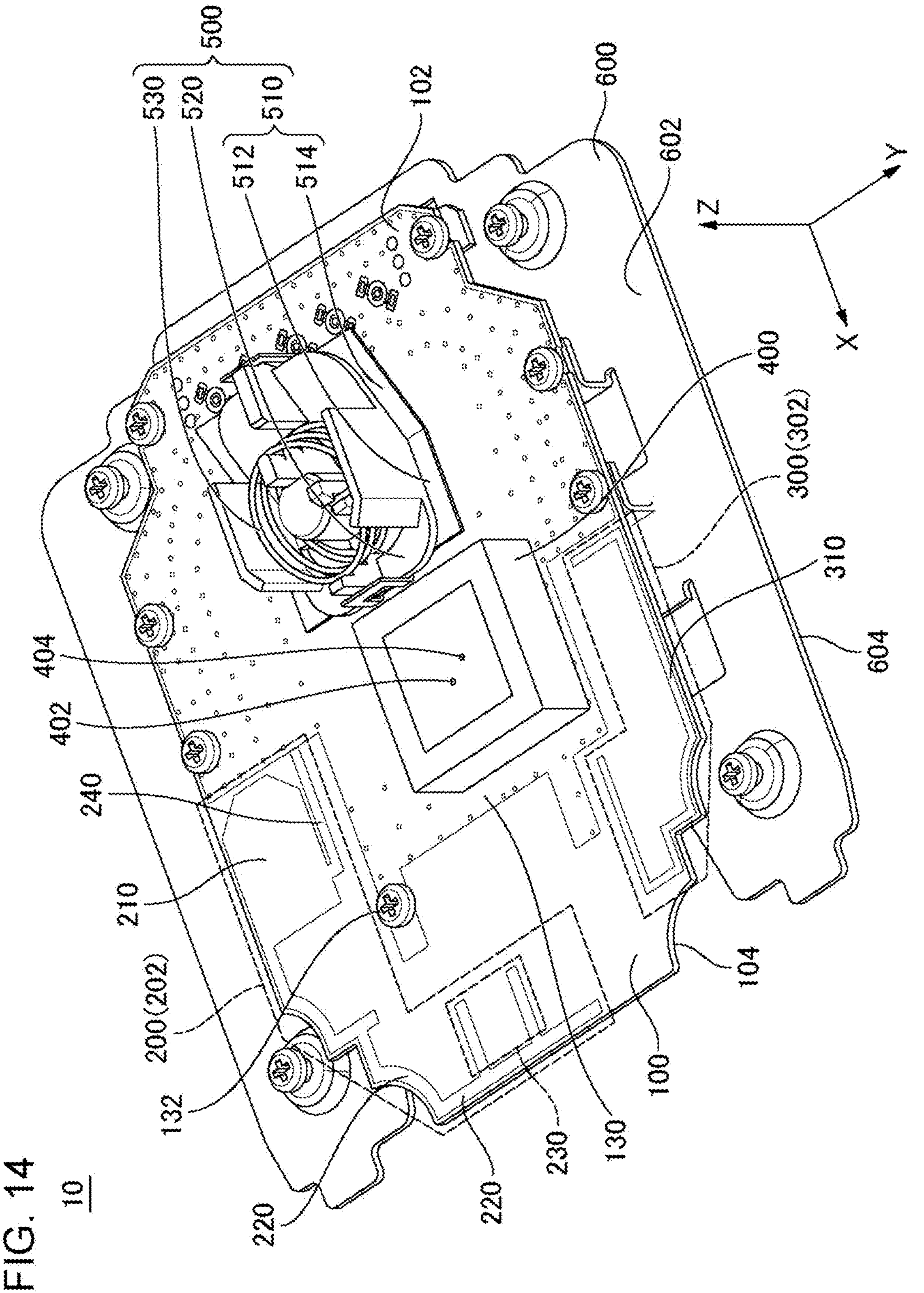
FIG. 14 is a diagram showing a sixth modification example of FIG. 1.

FIG. 14 is a diagram showing a sixth modification example of FIG. 1. An antenna device 10 shown in FIG. 14 is the same as the antenna device 10 shown in FIG. 1 except for the following points.

As shown in FIG. 14, the positive direction of the first direction X of the antenna device 10 may be opposite to the positive direction of the first direction X of the antenna device 10 shown in FIG. 1, and the fourth antenna 500 may be positioned on a side in the negative direction of the first direction X of the first antenna 200, the second antenna 300, and the third antenna 400. Specifically, in an example shown in FIG. 14, the first antenna 200, the second antenna 300, and the third antenna 400 are positioned opposite to the second portion 514 of the conductive plate 510 across the first portion 512 of the conductive plate 510. That is, the opening 620 may be arranged on the side in the negative direction of the first direction X, and the notch 610 may be arranged on the side in the positive direction of the first direction X. The third antenna 400 is positioned between the first antenna 200 and the second antenna 300 in the second direction Y.

In the example shown in FIG. 14, the center of the third antenna 400 is displaced to the side in the positive direction of the second direction Y relative to the virtual line passing through the center of the fourth antenna 500 in parallel with the first direction X. Note that the center of the third antenna 400 may be positioned on the virtual line or may be displaced to the side in the negative direction of the second direction Y.

As described above, the embodiment and the modification examples of the invention have been described referring to the drawings, these are examples of the invention, and various configurations other than the embodiment and the modification examples may also be employed.

For example, in the embodiment, the fourth antenna 500 is provided on the substrate 100 along with the main antenna for telephone (first antenna 200), the sub-antenna for telephone (second antenna 300), and the antenna for GNSS (third antenna 400). Note that the fourth antenna 500 may be provided on the substrate 100 alone or may be provided on the substrate 100 along with antennas of different types from the antennas described in the embodiment.

In the embodiment, although the first antenna 200 and the second antenna 300 are configured by providing a conductive pattern on the substrate 100, the first antenna 200 and the second antenna 300 may be configured with a conductor, such as sheet metal, in a three-dimensional manner.

According to the specification, the following aspects are provided.

(Aspect 1-1)

An antenna device including a substrate including a first surface, a conductive plate provided on the first surface side of the substrate, and an antenna element provided on the conductive plate, in which the conductive plate includes a first portion along the first surface of the substrate, and a second portion inclined at a first predetermined angle relative to the first surface of the substrate, the antenna element is inclined at a second predetermined angle relative to the first surface of the substrate from the first surface of the substrate toward a side on which the second portion of the conductive plate is inclined.

According to Aspect 1-1, the antenna element can be obliquely inclined relative to the substrate.

(Aspect 1-2)

The antenna device described in Aspect 1-1, further including a ground plate holding the substrate, in which the conductive plate is electrically floating from the ground plate.

According to Aspect 1-2, the conductive plate and the ground plate can be easily attached.

(Aspect 1-3)

The antenna device described in Aspect 1-1 or 1-2, in which the antenna element is connected to the substrate through a conductor.

According to Aspect 1-3, the antenna element can be easily fed.

(Aspect 1-4)

The antenna device described in Aspect 1-3, in which the conductor is a part of the antenna element.

According to Aspect 1-4, the conductor can be easily attached to the antenna element.

(Aspect 1-5)

The antenna device described in any one of Aspects 1-1 to 1-4, in which the antenna element includes a radiating element including at least one shape of a helical shape, a sheet shape, a plate shape, a meandering shape, a fractal shape, and a spiral shape.

According to Aspect 1-5, the antenna element including the radiating element including at least one shape of the helical shape, the sheet shape, the plate shape, the meandering shape, the fractal shape, and the spiral shape, can be stably inclined obliquely relative to the substrate.

(Aspect 1-6)

The antenna device described in any one of Aspects 1-1 to 1-5, in which a portion of the conductive plate between the first portion and the second portion is bent.

According to Aspect 1-6, the conductive plate can be easily manufactured.

(Aspect 1-7)

The antenna device described in any one of Aspects 1-1 to 1-6, further including a support part supporting the antenna element, in which the support part includes a portion inclined at the first predetermined angle from the first surface of the substrate.

According to Aspect 1-7, the support part can be easily aligned relative to the second portion of the conductive plate.

(Aspect 1-8)

The antenna device described in Aspect 1-7, in which a bottom surface of the support part includes a first bottom surface portion along the first portion of the conductive plate, and a second bottom surface portion along the second portion of the conductive plate.

According to Aspect 1-8, the support part can be easily aligned relative to the first portion and the second portion of the conductive plate.

(Aspect 1-9)

The antenna device described in Aspect 1-7 or 1-8, in which the conductive plate includes a first engaging portion, and the support part includes a second engaging portion engageable with the first engaging portion of the conductive plate.

According to Aspect 1-9, work of attaching the antenna element can be simplified.

(Aspect 1-10)

The antenna device described in any one of Aspects 1-7 to 1-9, in which the first portion of the conductive plate includes a hole portion through which a fixing member to fix the support part to the substrate or a guide member to align the support part relative to the substrate is passable.

According to Aspect 1-10, the support part can be stably fixed to the substrate with the fixing member and to stably align the support part relative to the substrate with the guide member.

(Aspect 1-11)

The antenna device described in any one of Aspects 1-1 to 1-10, further including an antenna for GNSS provided on the first surface of the substrate, in which the antenna for GNSS is positioned opposite to the second portion of the conductive plate across the first portion of the conductive plate.

According to Aspect 1-11, in the antenna device including the antenna for GNSS, the antenna element can be stably inclined relative to the substrate.

(Aspect 1-12)

The antenna device described in any one of Aspects 1-1 to 1-10, further including an antenna for telephone provided on the first surface of the substrate, and an antenna for GNSS provided on the first surface of the substrate, in which the antenna for telephone and the antenna for GNSS are positioned opposite to the second portion of the conductive plate across the first portion of the conductive plate.

According to Aspect 1-12, in the antenna device including the antenna for telephone and the antenna for GNSS, the antenna element can be stably inclined relative to the substrate.

(Aspect 1-13)

The antenna device described in Aspect 1-12, in which the antenna for telephone includes a first antenna and a second antenna, and the antenna for GNSS is positioned between the first antenna and the second antenna.

According to Aspect 1-13, in the antenna device including a plurality of antennas for telephone and the antenna for GNSS, the antenna element can be stably inclined relative to the substrate.

(Aspect 1-14)

The antenna device described in any one of Aspects 1-1 to 1-13, in which the antenna element is an antenna for ETC.

According to Aspect 1-14, the antenna for ETC can be stably inclined relative to the substrate.

(Aspect 2-1)

An antenna device including a substrate including a first surface, a first antenna provided on the substrate, a second antenna provided on the substrate, and a third antenna provided on the first surface of the substrate, in which a center point of the third antenna is positioned on a same side as an end portion of the second antenna furthest from the first antenna, relative to a centerline passing through a center of a line connecting an end portion of the first antenna furthest from the second antenna and the end portion of the second antenna furthest from the first antenna, or relative to a center line of the first surface of the substrate.

According to Aspect 2-1, the radiation directivity of the third antenna positioned between the first antenna and the second antenna can be improved.

(Aspect 2-2)

The antenna device described in Aspect 2-1, in which the first antenna includes a first conductive pattern, and the second antenna includes a second conductive pattern.

According to Aspect 2-2, the radiation directivity of the third antenna in the zenithal direction can be less influenced by the first antenna or the second antenna.

(Aspect 2-3)

The antenna device described in Aspect 2-1 or 2-2, in which the first antenna includes a main portion, an extension portion extending from the main portion, and at least one branch portion branching from the extension portion.

According to Aspect 2-3, the operation band cab be widened.

(Aspect 2-4)

The antenna device described in Aspect 2-3, further including a ground plate holding the substrate, in which at least a portion of the main portion overlaps the ground plate, and the at least one branch portion does not overlap the ground plate.

According to Aspect 2-4, desired characteristics of the first antenna can be realized while reducing the size of the antenna device.

(Aspect 2-5)

The antenna device described in Aspect 2-3 or 2-4, in which the first antenna further includes a short-circuit portion extending from the main portion and connected to ground.

According to Aspect 2-5, the radiation efficiency of the first antenna can be improved.

(Aspect 2-6)

The antenna device described in any one of Aspects 2-1 to 2-5, in which the first antenna is an antenna for telephone, the second antenna is an antenna for telephone, and the third antenna is an antenna for GNSS.

According to Aspect 2-6, the inclination of the radiation directivity of the antenna for GNSS positioned between the two antennas for telephone from the zenithal direction can be reduced and the radiation directivity for GNSS can be improved.

(Aspect 3-1)

An antenna device including a substrate including a first surface, a first antenna provided on the substrate, a second antenna provided on the substrate, a third antenna provided on the first surface of the substrate, and a metal-containing member other than an antenna positioned between the first antenna and the second antenna, in which the metal-containing member is positioned on a same side as an end portion of the second antenna furthest from the first antenna, relative to a center line passing through a center of a line connecting an end portion of the first antenna furthest from the second antenna and the end portion of the second antenna furthest from the first antenna, or relative to a center line of the first surface of the substrate.

According to Aspect 3-1, the oscillation of the third antenna due to an influence of the metal-containing member can be suppressed compared to when the metal-containing member is positioned on a side opposite to the end portion of the second antenna furthest from the first antenna relative to the center line.

(Aspect 3-2)

The antenna device described in Aspect 3-1, in which the metal-containing member is in non-conduction with a conductor pattern provided on the substrate.

According to Aspect 3-2, the oscillation of the third antenna due to an influence of the metal-containing member can be suppressed compared to when the metal-containing member is in conduction with the conductor pattern provided on the substrate.

(Aspect 3-3)

An antenna device including a substrate including a first surface, a first antenna provided on the substrate, a second antenna provided on the substrate, a third antenna provided on the first surface of the substrate, and a metal-containing member other than an antenna provided on the substrate and positioned between the first antenna and the second antenna, in which the metal-containing member is in non-conduction with a conductor pattern provided on the substrate.

According to Aspect 3-3, the oscillation of the third antenna due to an influence of the metal-containing member can be suppressed compared to when the metal-containing member is in conduction with the conductor pattern provided on the substrate.

(Aspect 3-4)

The antenna device described in any one of Aspects 3-1 to 3-3, in which the metal-containing member includes at least one of a screw, a vis, a pin, a bolt, a spring, and a holder.

According to Aspect 3-4, the oscillation of the third antenna due to an influence of at least one of the screw, the vis, the pin, the bolt, the spring, and the holder can be suppressed.

(Aspect 3-5)

The antenna device described in any one of Aspects 3-1 to 3-4, in which the first antenna includes a first conductive pattern, and the second antenna includes a second conductive pattern.

According to Aspect 3-5, the radiation directivity of the third antenna in the zenithal direction can be less influenced by the first antenna or the second antenna.

(Aspect 3-6)

The antenna device described in any one of Aspects 3-1 to 3-5, in which the first antenna includes a main portion, an extension portion extending from the main portion, and at least one branch portion branching from the extension portion.

According to Aspect 3-6, the operation band can be widened.

(Aspect 3-7)

The antenna device described in Aspect 3-6, further including a ground plate holding the substrate, in which at least a portion of the main portion overlaps the ground plate, and the at least one branch portion does not overlap the ground plate.

According to Aspect 3-7, desired characteristics of the first antenna can be realized while reducing the size of the antenna device.

(Aspect 3-8)

The antenna device described in Aspect 3-6 or 3-7, in which the first antenna further includes a short-circuit portion extending from the main portion and connected to ground.

According to Aspect 3-8, the radiation efficiency of the first antenna can be improved.

(Aspect 3-9)

The antenna device described in any one of the aspects 3-1 to 3-8, in which the first antenna is an antenna for telephone, the second antenna is an antenna for telephone, and the third antenna is an antenna for GNSS.

According to Aspect 3-9, oscillation of the antenna for GNSS positioned between the two antennas for telephone due to an influence of the metal-containing member can be suppressed.

This application claims priority based on Japanese Patent Application No. 2019-196598, filed Oct. 29, 2019, the entire disclosure of which is incorporated herein.

REFERENCE SIGNS LIST

10: antenna device
100: substrate
102: first surface
104: second surface
110*a*: first terminal
110*b*: second terminal
110*c*: third terminal
110*d*: fourth terminal
110*e*: fifth terminal
120*a*: first wiring
120*b*: second wiring
130: third conductive pattern
132: conductive screw
200: first antenna
202: first conductive pattern
210: main portion
220: first extension portion
230: branch portion
240: short-circuit portion
300: second antenna
302: second conductive pattern
310: second extension portion
400: third antenna
402: first feed point
404: second feed point
500: fourth antenna
510: conductive plate
512: first portion
514: second portion
520: support part
522: bottom surface
522*a*: first bottom surface portion
522*b*: second bottom surface portion
530: helical antenna
532: winding portion
534: first end portion
536: second end portion
542: first hole portion
544: second hole portion
552: first engaging portion
552*a*: first engaging portion
552*b*: first engaging portion
554: second engaging portion
554*a*: second engaging portion
554*b*: second engaging portion
562*a*: first protrusion portion
562*b*: second protrusion portion
562*c*: third protrusion portion
562*d*: fourth protrusion portion
564: third engaging portion
572: base
574: radiating element
600: ground plate
602: third surface
604: fourth surface
610: notch
620: opening
CL: center line
CP: center point
EP1: end portion
EP2: end portion
ER1: end region
ER2: end region
L: line
X: first direction
Y: second direction
Z: third direction

The invention claimed is:

1. An antenna device comprising:

a substrate including a first surface;

a first antenna provided on the substrate;

a second antenna provided on the substrate; and a third antenna provided on the first surface of the substrate, wherein a center point of the third antenna is positioned on a same side as an end portion of the second antenna furthest from the first antenna, relative to a center line passing through a center of a line connecting an end portion of the first antenna furthest from the second antenna and the end portion of the second antenna furthest from the first antenna, or relative to a center line of the first surface of the substrate.

2. The antenna device according to claim 1, wherein the first antenna includes a first conductive pattern, and the second antenna includes a second conductive pattern.

3. The antenna device according to claim 1, wherein the first antenna includes a main portion, an extension portion extending from the main portion, and at least one branch portion branching from the extension portion.

4. The antenna device according to claim 3, further comprising:

a ground plate holding the substrate, wherein at least a portion of the main portion overlaps the ground plate, and the at least one branch portion does not overlap the ground plate.

5. The antenna device according to claim 3, wherein the first antenna further includes a short-circuit portion extending from the main portion and connected to ground.

6. The antenna device according to claim 1, wherein the first antenna is an antenna for telephone, the second antenna is an antenna for telephone, and the third antenna is an antenna for GNSS.

7. An antenna device comprising:

a substrate including a first surface;

a first antenna provided on the substrate;

a second antenna provided on the substrate;

a third antenna provided on the first surface of the substrate; and a metal-containing member other than an antenna positioned between the first antenna and the second antenna, wherein the metal-containing member is positioned on a same side as an end portion of the second antenna furthest from the first antenna, relative to a center line passing through a center of a line connecting an end portion of the first antenna furthest from the second antenna and the end portion of the second antenna furthest from the first antenna, or relative to a center line of the first surface of the substrate.

8. The antenna device according to claim 7, wherein the metal-containing member is in non-conduction with a conductor pattern provided on the substrate.

9. The antenna device according to claim 7, wherein the metal-containing member includes at least one of a screw, a vis, a pin, a bolt, a spring, and a holder.

10. The antenna device according to claim 7, wherein the first antenna includes a first conductive pattern, and the second antenna includes a second conductive pattern.

11. The antenna device according to claim 7, wherein the first antenna includes a main portion, an extension portion extending from the main portion, and at least one branch portion branching from the extension portion.

12. The antenna device according to claim 11, further comprising:

a ground plate holding the substrate, wherein at least a portion of the main portion overlaps the ground plate, and the at least one branch portion does not overlap the ground plate.

13. The antenna device according to claim 11, wherein the first antenna further includes a short-circuit portion extending from the main portion and connected to ground.

14. The antenna device according to claim 7, wherein the first antenna is an antenna for telephone, the second antenna is an antenna for telephone, and the third antenna is an antenna for GNSS.

15. An antenna device comprising:

a substrate including a first surface;

a first antenna provided on the substrate;

a second antenna provided on the substrate;

a third antenna provided on the first surface of the substrate; and a metal-containing member other than an antenna provided on the substrate and positioned between the first antenna and the second antenna, wherein the metal-containing member is in non-conduction with a conductor pattern provided on the substrate.

16. The antenna device according to claim 15, wherein the metal-containing member includes at least one of a screw, a vis, a pin, a bolt, a spring, and a holder.

17. The antenna device according to claim 15, wherein the first antenna includes a first conductive pattern, and the second antenna includes a second conductive pattern.

18. The antenna device according to claim 15, wherein the first antenna includes a main portion, an extension portion extending from the main portion, and at least one branch portion branching from the extension portion.

19. The antenna device according to claim 18, further comprising:

a ground plate holding the substrate, wherein at least a portion of the main portion overlaps the ground plate, and the at least one branch portion does not overlap the ground plate.

20. The antenna device according to claim 18, wherein the first antenna further includes a short-circuit portion extending from the main portion and connected to ground.

* * * * *